US011002875B2

(12) United States Patent
Chen et al.

(10) Patent No.: US 11,002,875 B2
(45) Date of Patent: May 11, 2021

(54) APPARATUS AND METHOD FOR DETERMINING EARTH FLUID FORMATION

(71) Applicant: HALLIBURTON ENERGY SERVICES, INC., Houston, TX (US)

(72) Inventors: Songhua Chen, Katy, TX (US); Wei Shao, Conroe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 86 days.

(21) Appl. No.: 15/580,583

(22) PCT Filed: Jun. 30, 2016

(86) PCT No.: PCT/US2016/040495
§ 371 (c)(1),
(2) Date: Dec. 7, 2017

(87) PCT Pub. No.: WO2017/023460
PCT Pub. Date: Feb. 9, 2017

(65) Prior Publication Data
US 2018/0164465 A1 Jun. 14, 2018

Related U.S. Application Data

(60) Provisional application No. 62/199,890, filed on Jul. 31, 2015.

(51) Int. Cl.
*G01V 3/32* (2006.01)
*G01V 3/38* (2006.01)

(52) U.S. Cl.
CPC .................. *G01V 3/32* (2013.01); *G01V 3/38* (2013.01); *G01V 2210/1234* (2013.01); *G01V 2210/644* (2013.01); *G01V 2210/646* (2013.01)

(58) Field of Classification Search
CPC ... G01V 3/32; G01V 3/38; G01V 3/24; G01V 3/28; G01N 24/081; G01R 33/448
See application file for complete search history.

(56) References Cited

U.S. PATENT DOCUMENTS 6,229,308 B1 5/2001 Freedman
7,388,374 B2 6/2008 Minh et al.
(Continued)

FOREIGN PATENT DOCUMENTS

WO 2009105659 A2 8/2009
WO 2009105659 A3 8/2009
WO 2013151985 A2 10/2013

OTHER PUBLICATIONS

International Search Report and Written Opinion; PCT Application No. PCT/US2016/040495; dated Oct. 14, 2016.
(Continued)

*Primary Examiner* — Bryan Bui
(74) *Attorney, Agent, or Firm* — Polsinelli PC

(57) ABSTRACT

An apparatus comprising a data acquisition tool including NMR sensors, a data acquisition processor communicatively coupled with the NMR sensors, and a first memory storing instructions that cause the data acquisition processor to perform operations comprising acquiring data of earth formation fluid, varying at least one of a magnetic field gradient and an inter-echo time, and acquiring additional data. The apparatus further comprises a data processing unit comprising a second memory storing instructions that cause the data processor to perform operations comprising receiving data acquired by the data acquisition tool, constructing a mathematical model of the data, conducting a first inversion of the mathematical model to obtain a first set of NMR responses, performing a forward model of the first set of NMR responses obtained from the first inversion, conduct-
(Continued)

ing a second inversion to obtain a second set of NMR responses, and determining earth formation fluid properties.

21 Claims, 19 Drawing Sheets

(56) References Cited

U.S. PATENT DOCUMENTS

| | | | |
|---|---|---|---|
| 7,705,592 B2* | 4/2010 | Hursan | G01V 3/32 |
| | | | 324/301 |
| 8,395,384 B2 | 3/2013 | Fransson et al. | |
| 2004/0000905 A1 | 1/2004 | Freedman et al. | |
| 2005/0264285 A1 | 12/2005 | Chen et al. | |
| 2009/0198446 A1 | 8/2009 | Hursan | |
| 2010/0088033 A1 | 4/2010 | Chen et al. | |
| 2013/0193969 A1* | 8/2013 | Grunewald | G01V 3/14 |
| | | | 324/309 |

OTHER PUBLICATIONS

Search Report; European Application 16833470.4; dated Feb. 13, 2019.
Office Action; Brazilian Application BR112017028215-1; dated May 20, 2020.

* cited by examiner

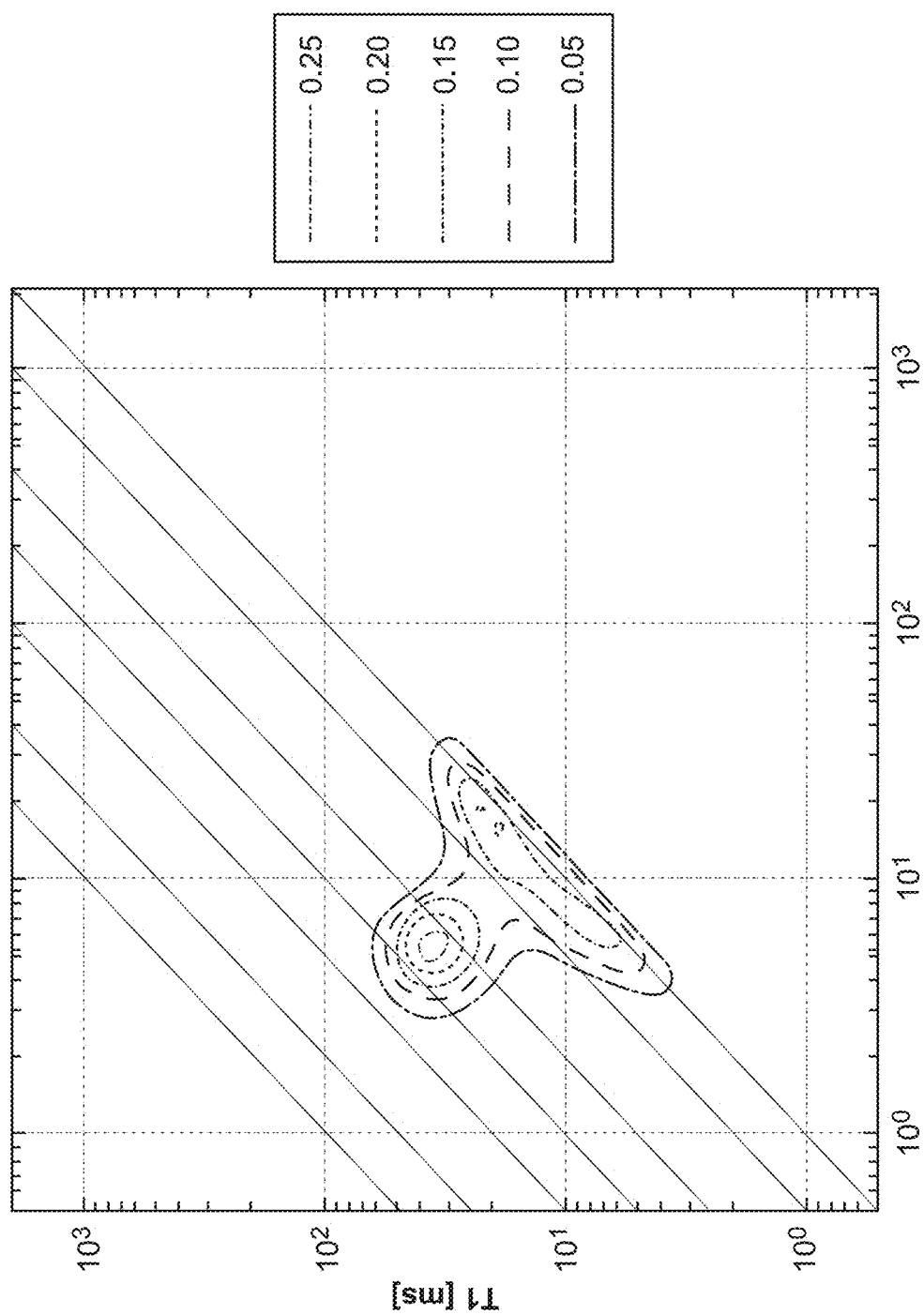

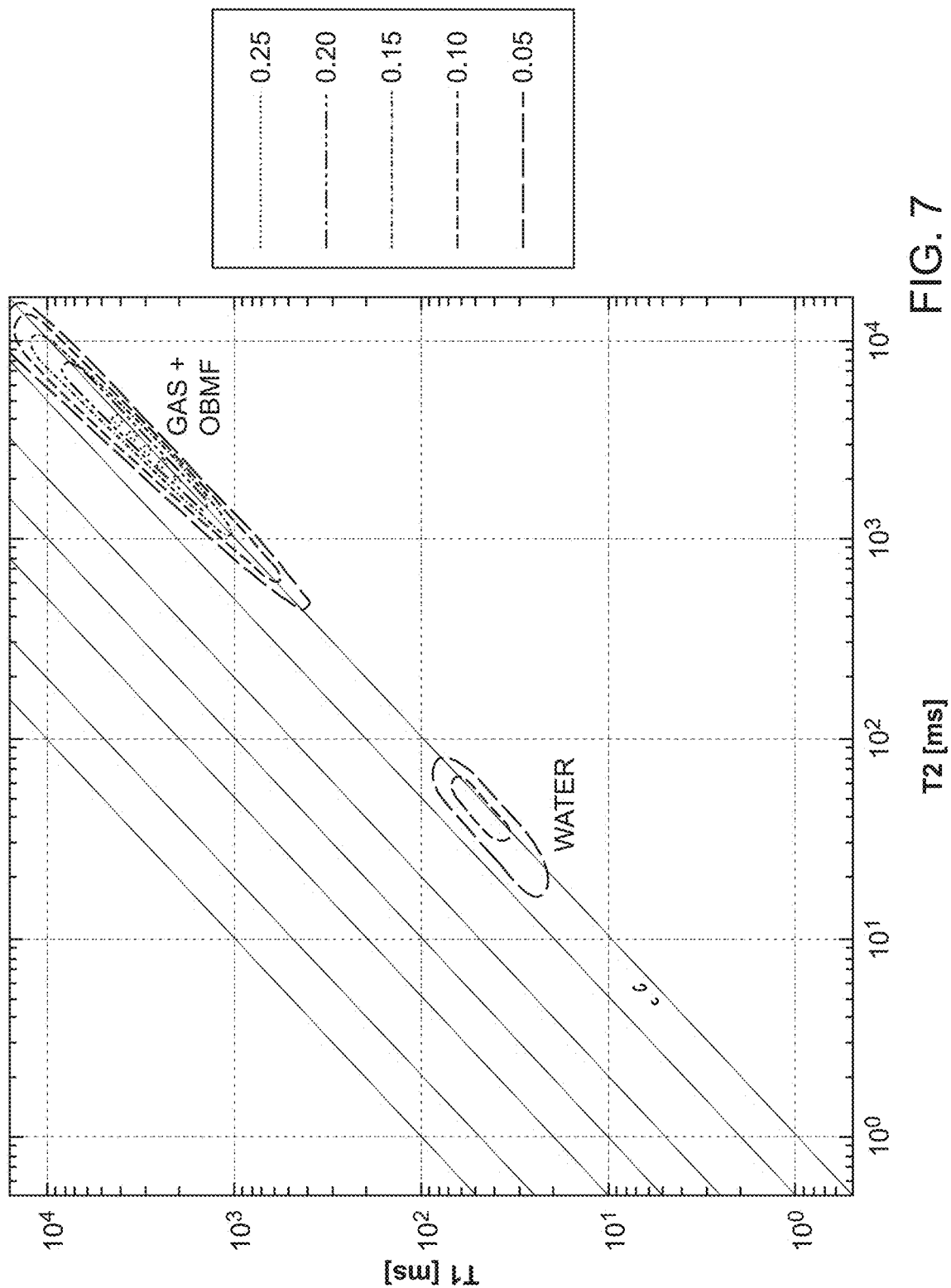

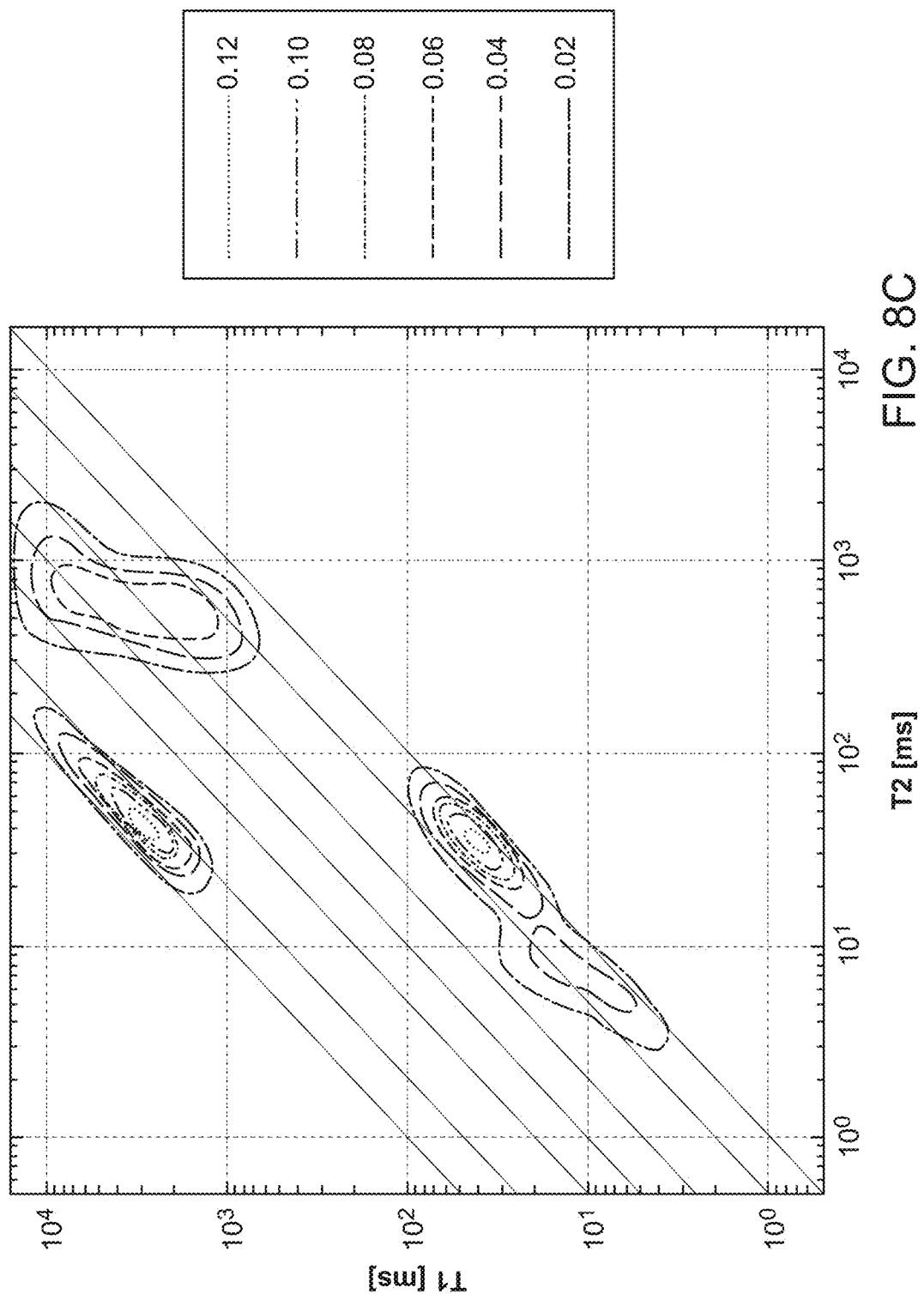

APPARATUS AND METHOD FOR DETERMINING EARTH FLUID FORMATION

CROSS-REFERENCE TO RELATED APPLICATIONS

The present application claims the benefit of U.S. Provisional Application No. 62/199,890, filed Jul. 31, 2015, which is hereby incorporated by reference in its entirety. This application is a national stage entry of PCT/US2016/040495 filed Jun. 30, 2016, said application is expressly incorporated herein in its entirety.

FIELD

The present disclosure relates generally nuclear magnetic resonance (NMR) well logging. In particular, the subject matter herein generally relates to determining earth formation fluid properties using a data acquisition tool comprising one or more NMR sensors.

BACKGROUND

Wellbores are drilled into the earth for a variety of purposes including tapping into hydrocarbon bearing formations to extract the hydrocarbons for use as fuel, lubricants, chemical production, and other purposes. In order to facilitate characterization of a subterranean formation and the fluids contained therein, it is often desirable to lower a NMR logging tool into a wellbore.

During various phases of wellbore operations it becomes necessary to determine the fluid properties of the earth formation drilled through. Fluid properties can be determined using nuclear magnetic resonance (NMR) logging. NMR logging measures the induced magnet moment of hydrogen nuclei contained within fluid-filled pores in porous material, such as rocks. Hydrogen protons primarily occur in pore fluids, such as oil, gas, and water. NMR logs can provide a wide range of information about the fluid which can be used to determine the rock composition of the earth formation and/or the type and quantity of fluid hydrocarbons within the earth formation.

BRIEF DESCRIPTION OF THE DRAWINGS

Implementations of the present technology will now be described, by way of example only, with reference to the attached figures, wherein:

FIG. 4C is an exemplary $T_1$-$T_2$ intensity map derived from D-$T_1$ and D-$T_2$;

FIG. 7 is an exemplary $T_1$-$T_{2intrinsic}$ intensity map;

FIG. 8C is an exemplary $T_1$-$T_{2app}$ intensity map derived from D-$T_1$ and D-$T_2$ when $G \cdot t_E = 20$;

DETAILED DESCRIPTION

Figure 1A:
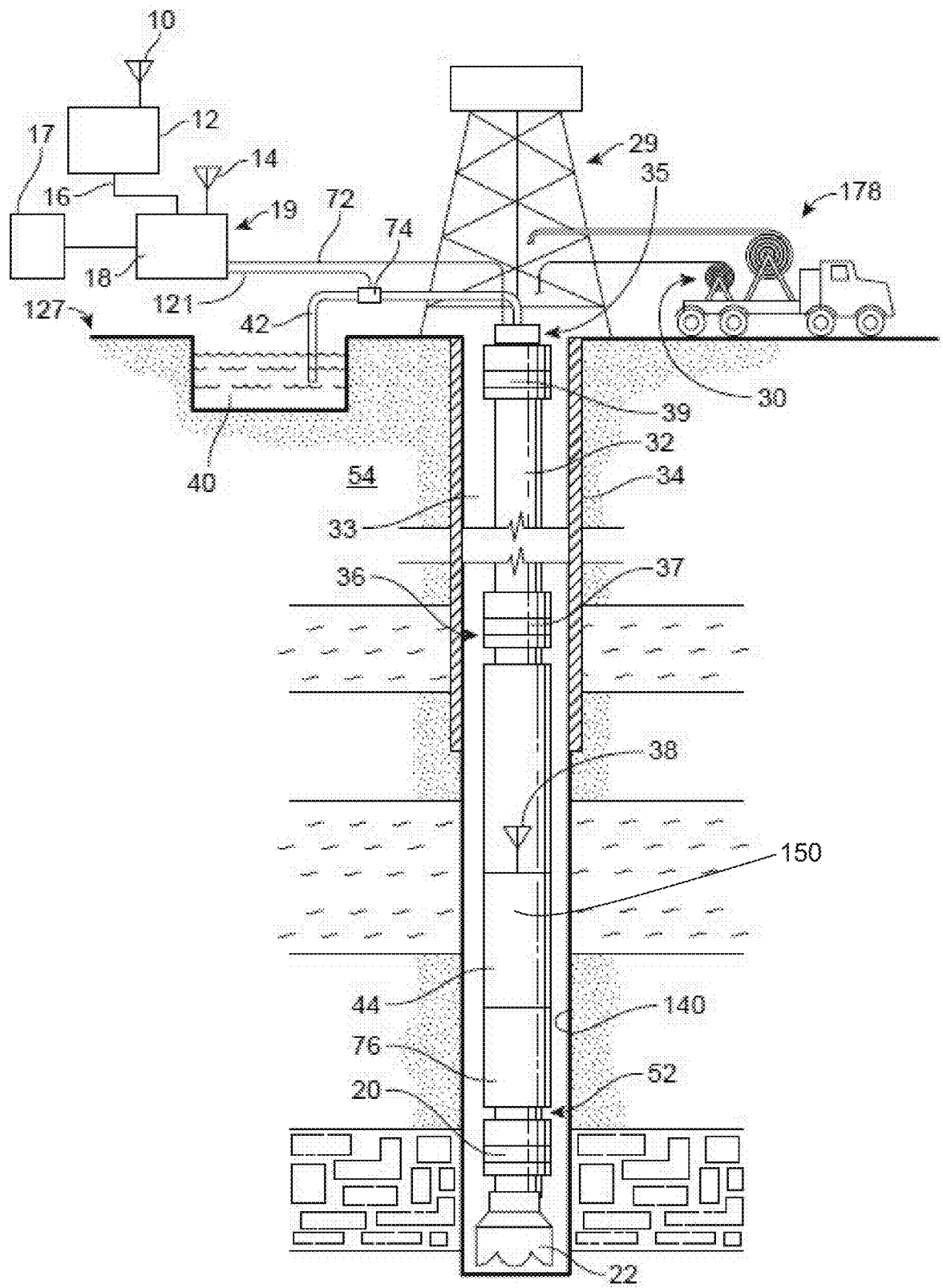
FIG. 1A is a diagram illustrating an exemplary wellbore operating environment in which the downhole logging tool, method, and system may be deployed, according to the disclosure herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the below description, with respect to a wellbore, reference to up or down is made for purposes of description with "up," "upper," "upward," "uphole," or "upstream" meaning toward the surface of the wellbore and with "down," "lower," "downward," "downhole," or "downstream" meaning toward the terminal end of the well, regardless of the wellbore orientation. "Above ground" or "on the surface" refers to a point outside or above the wellbore.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to, the things so described.

Disclosed herein are an apparatus, a method, and a system for determining fluid properties of an earth formation using a downhole data acquisition tool including one or more nuclear magnetic resonance (NMR) sensors. Data obtained from the NMR sensors can be used to create a mathematical model, for example, an echo train. Information about the fluid properties can be obtained by performing a first inversion of the mathematical model, forward modeling the results of the inversion, and performing a second inversion.

Logging data acquired by systems as described above can be processed to obtain the distributions of the longitudinal relaxation time, $T_1$, the transverse relaxation time, $T_2$, the intrinsic transverse relaxation time, $T_{2int}$, the apparent translational relaxation time, $T_{2app}$, or the diffusivity, D, of protons in the fluids, or the combinations of multiple of these parameters. Depending on fluid type, reservoir conditions, and earth formations, the NMR measured quantities for multiple fluids can overlap. In the alternative, in some earth formations, fluids can have significant contrast in measured NMR quantities.

NMR logging can be conducted during drilling operations in a subterranean well environment that is depicted schematically in FIG. 1A. A wellbore 140 is shown that has been drilled into the earth 54 from the ground's surface 127 using a drill bit 22. The drill bit 22 is located at the bottom, distal end of the drill string 32 and the bit 22 and drill string 32 are being advanced into the earth 54 by the drilling rig 29. The drilling rig 29 can be supported directly on land as shown or on an intermediate platform if at sea. For illustrative purposes, the top portion of the well bore includes casing 34 that is typically at least partially made up of cement and which defines and stabilizes the wellbore after being drilled. The drill bit 22 can be rotated via rotating the drill string, and/or a downhole motor near the drill bit 22.

As shown in FIG. 1A, the drill string 32 supports several components along its length, including a data acquisition tool 150. A sensor sub-unit 52 is shown for detecting conditions near the drill bit 22, conditions which can include such properties as formation fluid density, temperature and pressure, and azimuthal orientation of the drill bit 22 or string 32. Measurement while drilling (MWD)/logging while drilling (LWD) procedures are supported both structurally and communicatively, which can include the NMR logging operations as discussed herein. The instance of directional drilling is illustrated in FIG. 1A. The lower end portion of the drill string 32 can include a drill collar proximate the drilling bit 22 and a drilling device such as a rotary steerable drilling device 20, or other drilling devices disclosed herein. The drill bit 22 may take the form of a roller cone bit or fixed cutter bit or any other type of bit known in the art. The sensor sub-unit 52 is located in or proximate to the rotary steerable drilling device 20 and advantageously detects the azimuthal orientation of the rotary steerable drilling device 20. Other sensor sub-units 35, 36 are shown within the cased portion of the well which can be enabled to sense nearby characteristics and conditions of the drill string, formation fluid, casing and surrounding formation. Regardless of which conditions or characteristics are sensed, data indicative of those conditions and characteristics is either recorded downhole, for instance at the processor 44 for later download, or communicated to the surface either by wire using repeaters 37, 39 up to surface wire 72, or wirelessly or otherwise. If wirelessly, the downhole transceiver (antenna) 38 can be utilized to send data to a local processor 18, via topside transceiver (antenna) 14. There the data may be either processed or further transmitted along to a remote processor 12 via wire 16 or wirelessly via antennae 14 and 10.

Figure 1B:
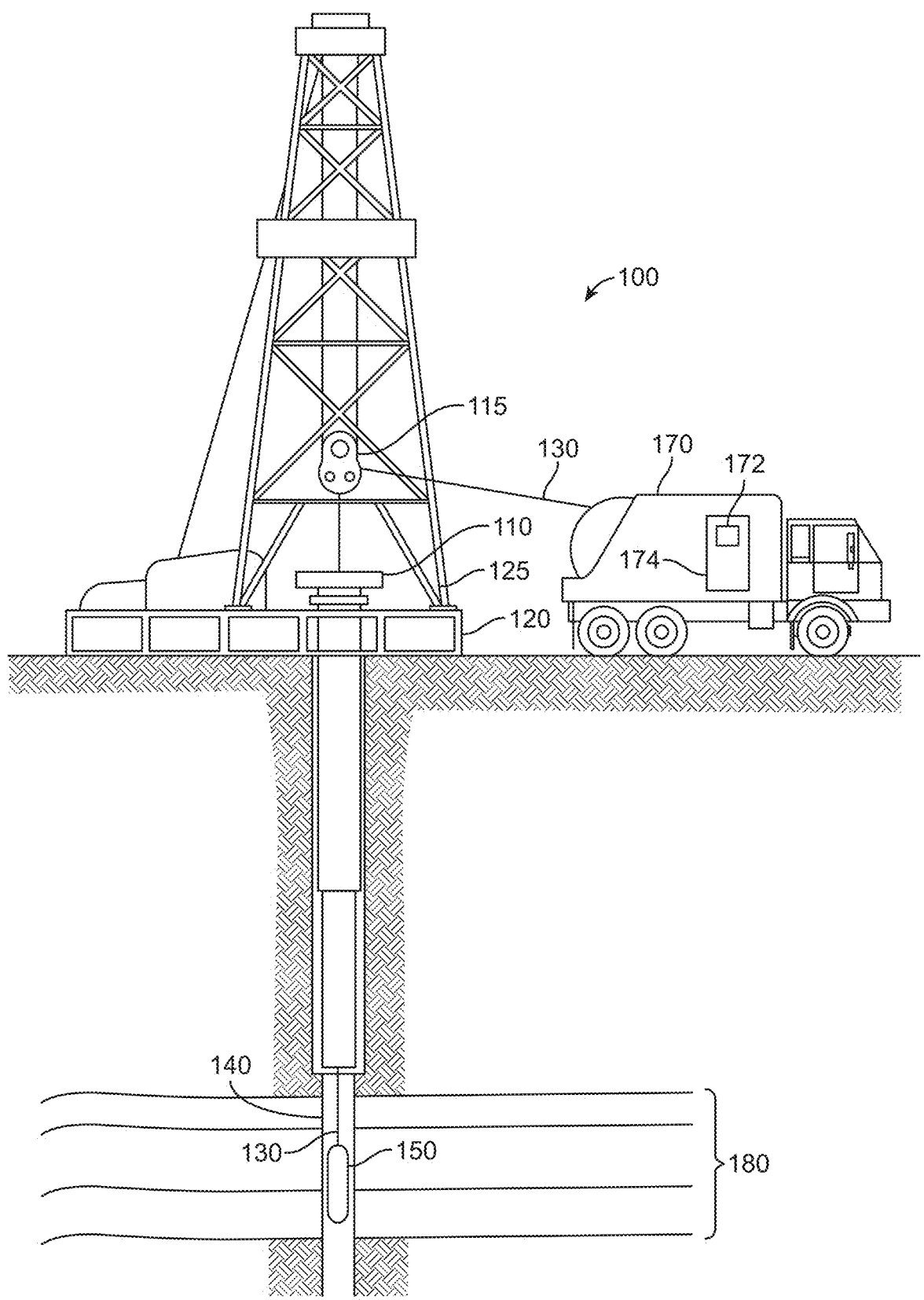
FIG. 1B is a diagram illustrating an exemplary wellbore operating environment in which the downhole logging tool, method, and system may be deployed, according to the disclosure herein.

Coiled tubing 178 and wireline 30 can additionally be deployed as an independent service upon removal of the drill string 32, as shown for example in FIG. 1B. The possibility of an additional mode of communication is contemplated using drilling mud 40 that is pumped via conduit 42 to a downhole mud motor 76. The drilling mud is circulated down through the drill string 32 and up the annulus 33 around the drill string 32 to cool the drill bit 22 and remove cuttings from the wellbore 140. For purposes of communication, resistance to the incoming flow of mud can be modulated downhole to send backpressure pulses up to the surface for detection at sensor 74, and from which representative data is sent along communication channel 121 (wired or wirelessly) to one or more processors 18, 12 for recordation and/or processing.

The sensor sub-unit 52 is located along the drill string 32 above the drill bit 22. The sensor sub-unit 36 is shown in FIG. 1A positioned above the mud motor 76 that rotates the drill bit 22. Additional sensor sub-units 35, 36 can be included as desired in the drill string 32. The sub-unit 52 positioned below the motor 76 communicates with the sub-unit 36 in order to relay information to the surface 127.

A surface installation 19 is shown that sends and receives data to and from the well. The surface installation 19 can exemplarily include a local processor 18 that can optionally communicate with one or more remote processors 12, 17 by wire 16 or wirelessly using antennae 10, 14.

The exemplary rotary steerable drilling device 20 schematically shown in FIG. 1A can also be referred to as a drilling direction control device or system. As shown, the rotary drilling device 20 is positioned on the drill string 32 with drill bit 22. However, one of skill in the art will recognize that the positioning of the rotary steerable drilling device 20 on the drill string 32 and relative to other components on the drill string 32 may be modified while remaining within the scope of the present disclosure.

FIG. 1B illustrates a system 100 according to various embodiments of the present disclosure. The data acquisition tool 150 can be used as part of a wireline logging operation, or as part of a downhole drilling operation. For example, FIG. 1B shows a well during wireline logging operations. A drilling platform 120 may be equipped with a derrick 125 that supports a hoist 115. Drilling oil and gas wells can be carried out using a string of drill pipes connected together so as to form a drilling string that is lowered through a rotary table 110 into a wellbore or borehole 140.

Here it is assumed that the drilling string has been temporarily removed from the borehole 140 to allow a data acquisition tool 150 to be lowered by wireline or logging cable 130 into the borehole 140. The data acquisition tool 150 can be lowered to a desired location and pulled upward at a substantially constant speed. As the data acquisition tool 150 is pulled upward, instruments included in the tool (e.g., NMR sensors) may be used to perform measurements on subsurface formations 180 adjacent the borehole 140. The measurement data can include a plurality of echo trains and can be transmitted to a logging facility 170 for storage, processing, and analysis. The logging facility 170 can be provided with electronic equipment for various types of signal processing. For example, the logging facility 170 may include one or more surface computers 172 and one or more displays 174. In the alternative, the data can be processed off-site.

Although FIG. 1B depicts a vertical wellbore 140, the present disclosure is equally well-suited for use in wellbores having other orientations including horizontal wellbores, slanted wellbores, multilateral wellbores or the like. It should be noted that while FIG. 1B generally depicts a land-based operation, those skilled in the art would readily recognize that the principles described herein are equally applicable to operations that employ floating or sea-based platforms and rigs, without departing form the scope of the disclosure.

Although FIGS. 1A and 1B show exemplary environments relating to NMR logging in the absence, or temporary cessation, of drilling operations and LWD operations, the present disclosure is equally well-suited to the characterization of core samples brought to the surface from subterranean formations. As such, the present disclosure is equally well-suited in the use of core analysis equipment for the characterization of core samples in a laboratory or surface environment.

Figure 2:
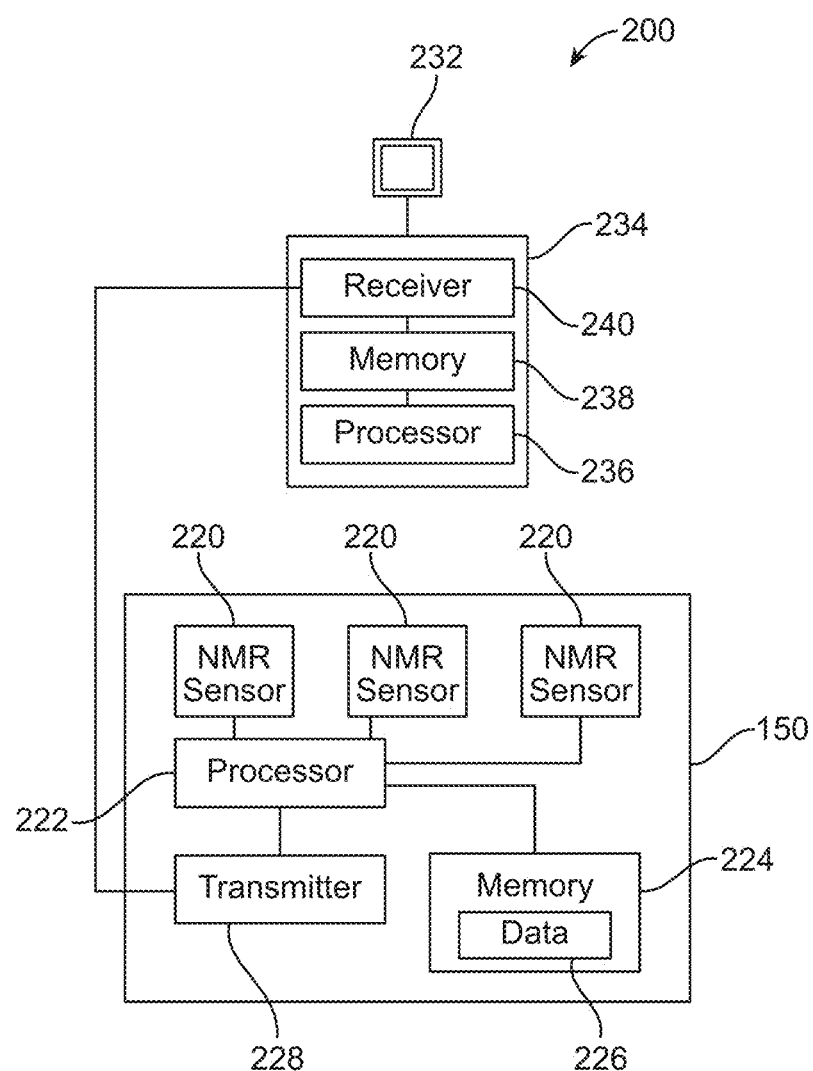
FIG. 2 is a diagram illustrating an apparatus according to the disclosure herein.

A variety of apparatuses, systems, and methods may be used to implement the activities described above. For example, FIG. 2 illustrates an apparatus 200 according to various embodiments of the present disclosure.

In some embodiments, the apparatus 200 may include a data acquisition tool 150 to acquire fluid signature data 226 associated with fluids in a material, such as a geologic formation. In addition, the data acquisition tool 150 may include one or more NMR sensors 220 and at least one memory 224 to store the fluid signature data 226. The data acquisition tool 150 may also include a processor 222 to constrain ratios of $T_1$ relaxation times to $T_2$ relaxation times. The data acquisition tool 150 can also include a transmitter 288 to transmit the fluid signature data 226 to an alternative location.

The apparatus 200 can further include a data processing unit 234. The data processing unit 234 can be located above-ground. In the alternative, the data processing unit can be downhole, for example, when using LWD or slickline tools. The data processing unit 234 can be communicatively coupled with a receiver 240 to receive transmitted fluid signature data 226. The data processing unit 234 can further include a processor 236, a memory 238, and a display 232. The display 232 may be used to display the location of a fluid type (e.g., water, gas, and/or oil) based on the fluid properties determined from the collected fluid signature data 226.

Depending on the objective of the fluid typing, two dimensional (2D) and two-and-a-half dimensional (2.5D) inversions can be used to derive the $D$–$T_2$, $D$–$T_2$–$T_1/T_2$, $D$–$T_1$, or $T_1/T_{2app}$ maps. In the alternative, a three dimensional (3D) inversion can be derived using Equation 1 (below). Equation 1 can be used to obtain ($T_1$, $T_2$, and $D$) simultaneously.

$$E(i, j, k) = \sum_{m=1}^{M}\sum_{n=1}^{N}\sum_{p=1}^{P} E_{0,mnp}\left[1 - e^{\left(-\frac{t_{w_k}}{T_{1,m}}\right)}\right] e^{\left(-i\left(\frac{t_{E_j}}{T_{2,n}}\right)\right)} e^{\left(-\frac{\gamma^2 G_l^2 \cdot t_{E_j}^3 D_p}{12}\right)} \quad (1)$$

wherein
$t_{W_k}$ represents the wait time of the $k^{th}$ echo train
$T_{1,m}$ represents the $m^{th}$ $T_1$ component
$t_{E_j}$ represents the $j^{th}$ inter-echo time
$T_{2,n}$ represents the $m^{th}$ $T_1$ component
$\gamma$ represents the proton gyromagnetic ratio
$G_l$ represents the magnetic field gradient corresponding to the $l^{th}$ echo train
$D_p$ represents the $p^{th}$ component of diffusivity.

In some cases, the fluid distributions in an earth formation can be determined through the analysis of one or more $T_1$–$T_2$ maps. Modern NMR logging instruments and core analysis instruments can acquire data with different field gradient (G) and echo spacing ($t_E$) combinations to obtain a plurality of echo trains by variation of the tool gradient at different operating frequencies. Such variation can create vagueness in the resulting $T_1$–$T_2$ maps due to dependency on $G \cdot t_E$.

The $T_1$–$T_2$ map can be derived in the following way. The 2.5D inversion, as described above, utilizes a physical constraint based on the intrinsic $T_2$ and $T_1$ relationship of fluids in porous material. Generally, bulk $T_1$ and intrinsic $T_2$ of liquids, such as water, light viscose oils, medium viscose oils, and hydrocarbon gases, are substantially similar. When trapped within a porous space, the ratio of $T_1/T_2$ can increase, for example, in the range of 1 to 5. On the other hand, heavy oil and tar have a high $T_1/T_2$ ratio. The observable $T_1/T_2$ ratio of NMR logging instruments is generally $1 \leq (R \equiv T_1/T_2) \leq 10$. When this constraint is applied to Equation 1, Equation 2 and Equation 3 are derived.

$$E(i, j, k) = \sum_{m=1}^{M'}\sum_{n=1}^{N}\sum_{p=1}^{P} E_{0,mnp}\left[1 - e^{\left(-\frac{t_{w_k}}{R_m T_{2,n}}\right)}\right] e^{\left(-i\left(\frac{t_{E_j}}{T_{2,n}}\right)\right)} e^{\left(-\frac{\gamma^2 G_l^2 \cdot t_{E_j}^3 D_p}{12}\right)} \quad (2)$$

$$E(i, j, k) = \sum_{m=1}^{M''}\sum_{n=1}^{N}\sum_{p=1}^{P} E_{0,mnp}\left[1 - e^{\left(-\frac{t_{w_k}}{T_{1,n}}\right)}\right] e^{\left(-i\left(\frac{t_{E_j} R_m}{T_{1,n}}\right)\right)} e^{\left(-\frac{\gamma^2 G_l^2 \cdot t_{E_j}^3 D_p}{12}\right)} \quad (3)$$

where M' is less than m, which reduces the inversion matrix size. A single combined $D$–$T_2$ map may be computed by co-adding, pixel-by-pixel, the intensity of the individual $D$–$T_2$ maps $\Sigma_{m=1}^{M_t} = E_{0,mnp} = E_{0,np}$. The intensity maps herein are created in this manner, contour lines illustrate the intensity of the individual $D$–$T_1$ or $D$–$T_2$ maps with different R values.

For example, the fluid determination process can include a sequence of the following operations. First, echo trains are put through an inversion using Equation 2 to obtain a $D$–$T_2$ map. In the alternative, Equation 3 may be used to generate the $D$–$T_1$ map; or both Equations 2 and 3 can be used to obtain both a $D$–$T_1$ map and a $D$–$T_2$ map. Second, the resulting data is forward modeled, wherein the tool-dependent magnetic field gradient (G) is set equal to zero, and the $E_{0,mnp}$ of the 2D maps is obtained from Eqns. 2 or 3. Then, at least one of the data acquisition parameters, including wait time, echo spacing, and field gradient, is altered to create a plurality of synthetic echo trains.

The forward modeling step is followed by performing a second inversion of the NMR responses using Equation 4 (below). The inversion provides a set of $E_{0,mn}(T_{1,m}, T_{2,n})$ data, which can be subsequently used to obtain a $T_1$–$T_{2int}$ map. Depending on the types of fluid present in the measured system, certain fluids can have greater separation on the $T_1$–$T_{2int}$ map.

$$E_{rcon}(i, j, k) = \sum_{m=1}^{M}\sum_{n=1}^{N}\sum_{p=1}^{P} E_{0,mn}\left[1 - e^{\left(-\frac{t_{w_k}}{T_{1,m}}\right)}\right] e^{-i\left(\frac{t_{E_j}}{T_{2,n}}\right)} \quad (4)$$

In the alternative, the earth fluid formation can be determined through the analysis of a $T_1$–$T_{2app}$ map. The process of forward modeling the echo trains can be completed several times, using a variety of G values to achieve a $T_1-T_{2app}$ map. When the field gradient is zero, a $T_1-T_{2int}$ map is produced by the second inversion. In the alternative, when the field gradient is greater than zero, a plurality of echo trains can be generated based on the specified $G \cdot t_E$ values. The specified $G \cdot t_E$ values can be used to generate a $T_1-T_{2app}$ map. The $G \cdot t_E$ values can be selected to distinguish one fluid from the other based on the contrast of the ratio of $T_1/T_{2app}(G \cdot t_E)$. A contrast of 5 or larger may be sufficient to distinguish the fluid types.

The first inversion step and forward modeling are conducted as described above. A second inversion is performed using the forward modeled data to generate a plurality of echo trains with the specified $G \cdot t_E$ values can be performed on the forward modeled echo trains using Equation 5.

$$E_{rcon@Gt_E}(i,j,k) = \sum_{m=1}^{M} \sum_{n=1}^{N} E_{0,mn@Gt_E} \left[1 - e^{-\frac{t_{w_k}}{T_{1,m}}}\right] e^{-i\frac{t_{E_j}}{T_{2app,n}(Gt_E)}} \quad (5)$$

A 2D map of $T_1-T_{2app}$ can be generated with the inversion data $E_{0,mn@Gt_E}(T_{1,m}, T_{2app,n})$. When multiple $G \cdot t_E$ values are used, each value can be used in a forward model of echo trains. Then a second inversion is performed on each set of forward modeled echo trains. The resulting $T_1-T_{2app}$ maps can be compared to show the signal shift of one fluid, or multiple fluids.

EXAMPLES

The following examples are provided to illustrate the subject matter of the present application. The examples are not intended to limit the scope of the present disclosure and they should not be so interpreted. The data presented in the following examples was synthesized for the purpose of demonstration.

Example 1

Figure 3:
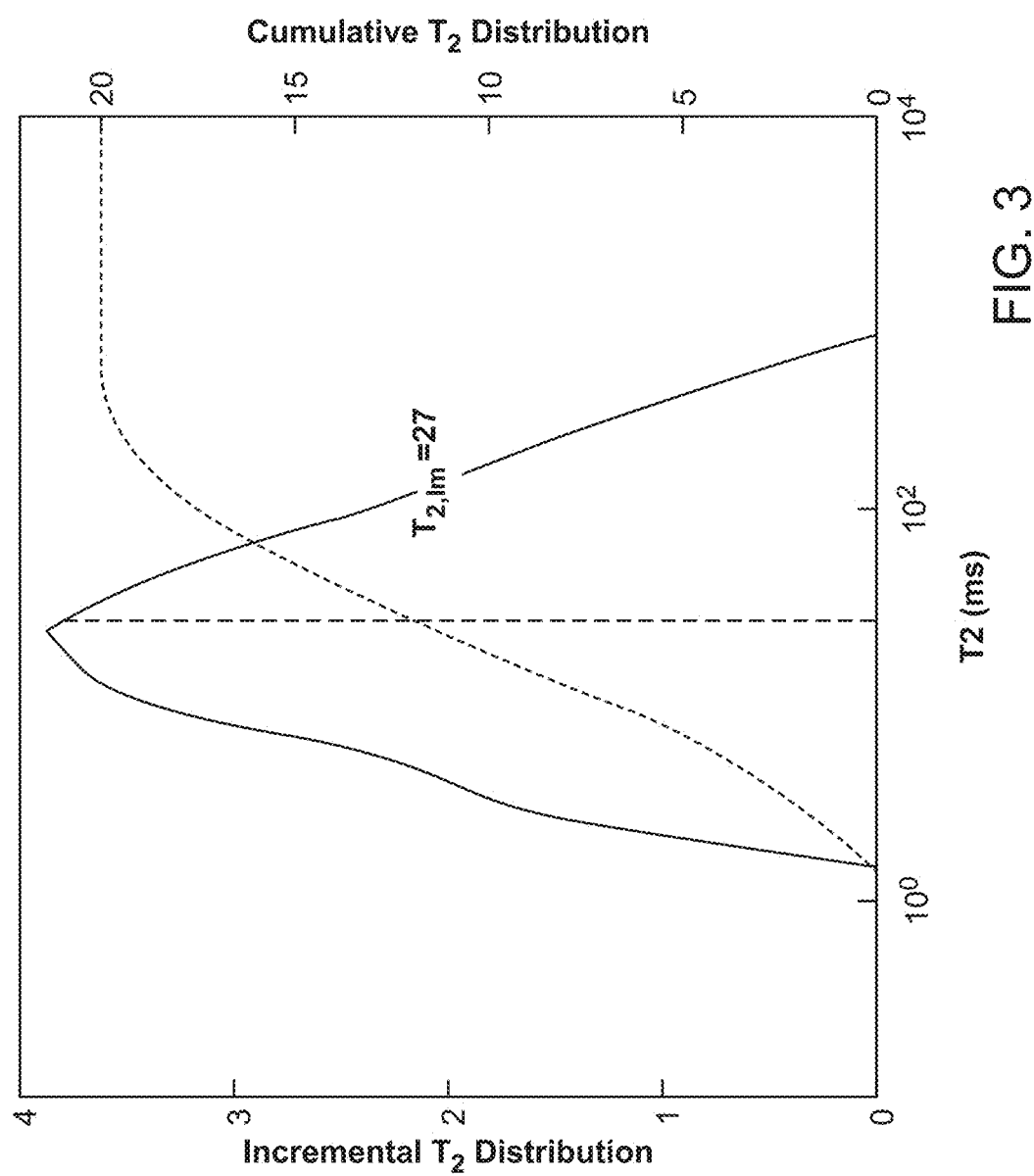
FIG. 3 is an exemplary water distribution curve.

A synthetic heavy oil reservoir is assumed having 1000 psi and 114° F., the reservoir having 60% water saturation and 40% oil saturation. The $T_1/T_2$ ratio was set to be 1.5 for water and 4 for oil. The type of oil present in the reservoir can be determined based on the American Petroleum Institute (API) gravity of the oil. An API gravity value of greater than 31.1 indicates a light oil that can float on water; on the other hand, an API gravity value of less than 22.3 indicates a heavy oil. The API gravity value is determined at the point where the water distribution line and oil distribution line intersect. The oil has a set API gravity value of 16, indicating the presence of a heavy oil within the reservoir. The presence of hydrocarbons within the water-wet rocks can alter the $T_2$ distribution map. The water distribution curve for the synthesized reservoir is illustrated in FIG. 3. In FIG. 3, the solid curve represents the incremental $T_2$ distribution and the dashed curve represents the cumulative $T_2$ distribution. The incremental and cumulative distributions are measured in porosity units (pu). The data provided in FIG. 3 can be used to determine the porosity of the geologic formation.

The NMR sensors acquire data that can be used to determine the types of pore-fluid using a plurality of echo trains. The parameters used to determine the fluid properties can include wait time ($t_w$), echo spacing ($t_E$), the number of echoes recorded ($N_E$), and the field gradient. The reservoir parameters are set to the values presented in Table 1 (below). The parameters also correspond to different noise levels and field gradient values. Noise-contaminated echo trains based on these data acquisition and tool attributes were generated using a random noise generator.

TABLE 1

| ID | $t_w$ (ms) | $t_E$ (ms) | $N_E$ | G (G/cm) |
|---|---|---|---|---|
| 1 | 5000 | 0.3 | 2000 | 40 |
| 2 | 5 | 0.2 | 50 | 40 |
| 3 | 10 | 0.2 | 50 | 40 |
| 4 | 5000 | 2.4 | 250 | 30 |
| 5 | 5000 | 3.6 | 167 | 35 |
| 6 | 5000 | 6 | 100 | 40 |
| 7 | 30 | 0.2 | 100 | 40 |
| 8 | 100 | 0.2 | 300 | 25 |
| 9 | 300 | 0.2 | 500 | 25 |
| 10 | 3 | 0.2 | 100 | 20 |
| 11 | 50 | 0.2 | 100 | 20 |

A first inversion is performed on the synthetic echo trains using Eqns. 2 and 3 to obtain $D-T_1$ and $D-T_2$ intensity maps.

Figure 4A:
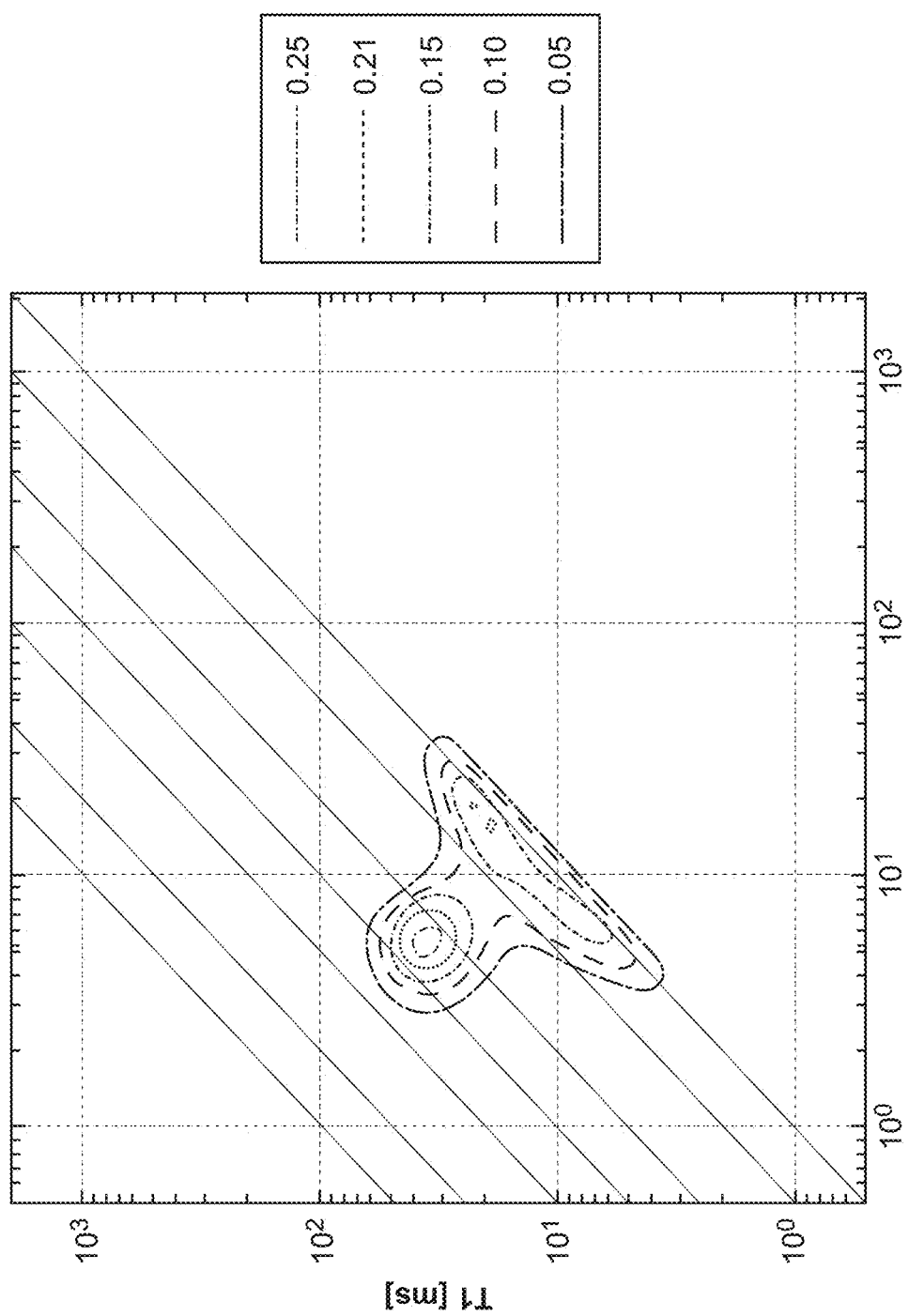
FIG. 4A is an exemplary $T_1$-$T_2$ intensity map derived from D-$T_1$.
Figure 4B:
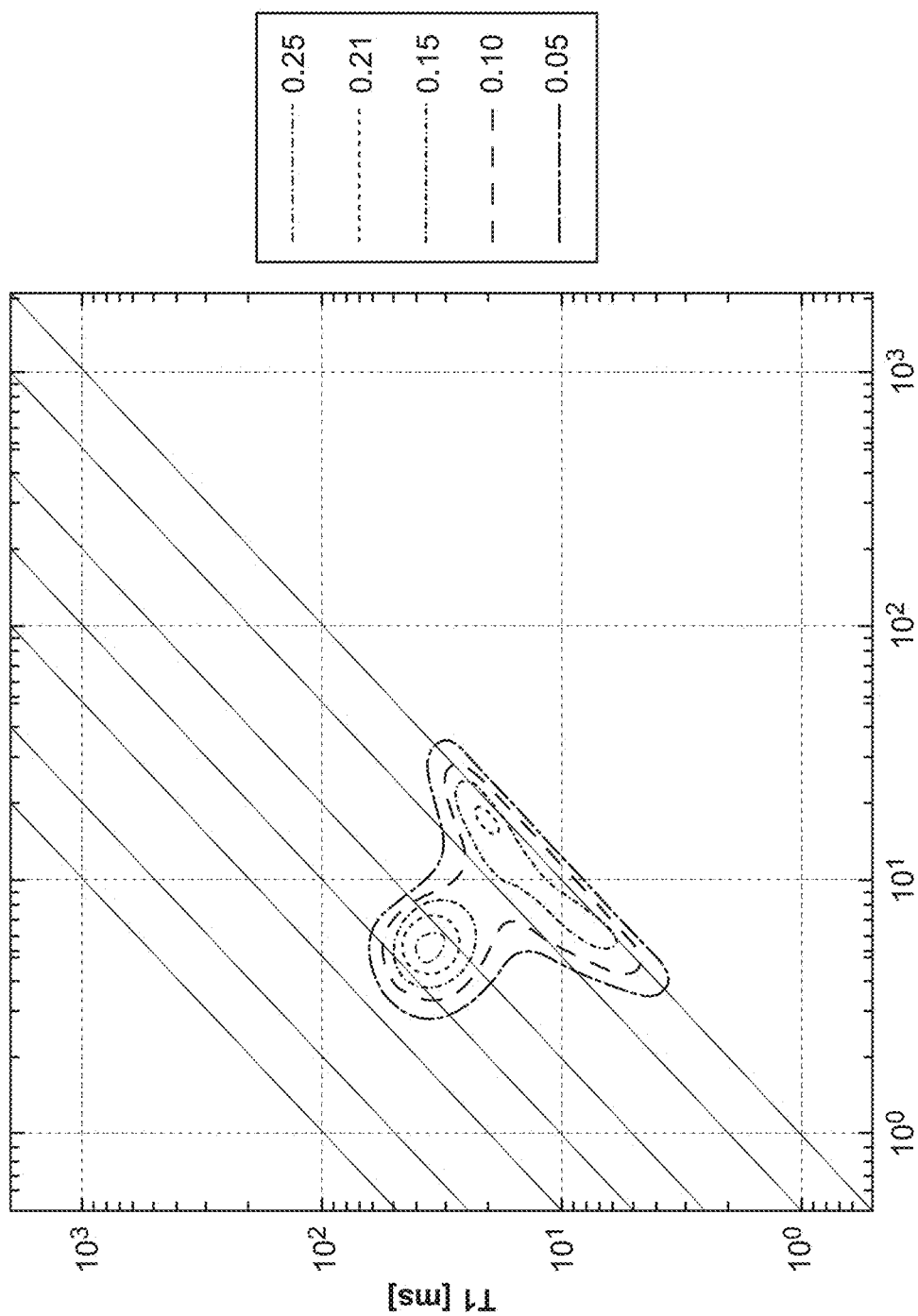
FIG. 4B is an exemplary $T_1$-$T_2$ intensity map derived from D-$T_2$.

Next, the echo trains are forward modeled using the $D-T_1$, the $D-T_2$, or both the $D-T_1$ and $D-T_2$ inversion data with null gradient. Third, a second inversion is performed, using Eqn. 4. The resulting $T_1-T_2$ intensity maps are shown in FIGS. 4A-4C. In FIGS. 4A-4C, the $T_1/T_2$ ratios are shown as diagonal lines starting in the bottom left corner and extending to the top right corner of each map. The ratio lines represent, from bottom to top, a $T_1/T_2$ of 1, 2, 4, 8, 16, 32, and 64, respectively.

More specifically, FIG. 4A illustrates a $T_1-T_2$ intensity map resulting from the inversion of the forward modeled $D-T_1$ data. In the $T_1-T_2$ map, the water signal appears between $T_1/T_2$ ratio lines 1 and 2, the heavy oil signal is centered around a $T_1/T_2$ ratio of 4. FIGS. 4A-4C illustrate the inversion results with noise superimposed, in order to simulate a more realistic result; thus the water and heavy oil signals are not completely separated. FIG. 4B illustrates the $T_1-T_2$ intensity map resulting from the $D-T_2$ inversion data. FIG. 4C illustrates the $T_1-T_2$ intensity map resulting from both the $D-T_1$ and $D-T_2$ inversion data. Accordingly, the maps generated according to the present disclosure enable a more realistic result and improved differentiation between the fluid signals, in particular, water and heavy oil.

Example 2

Figure 5:
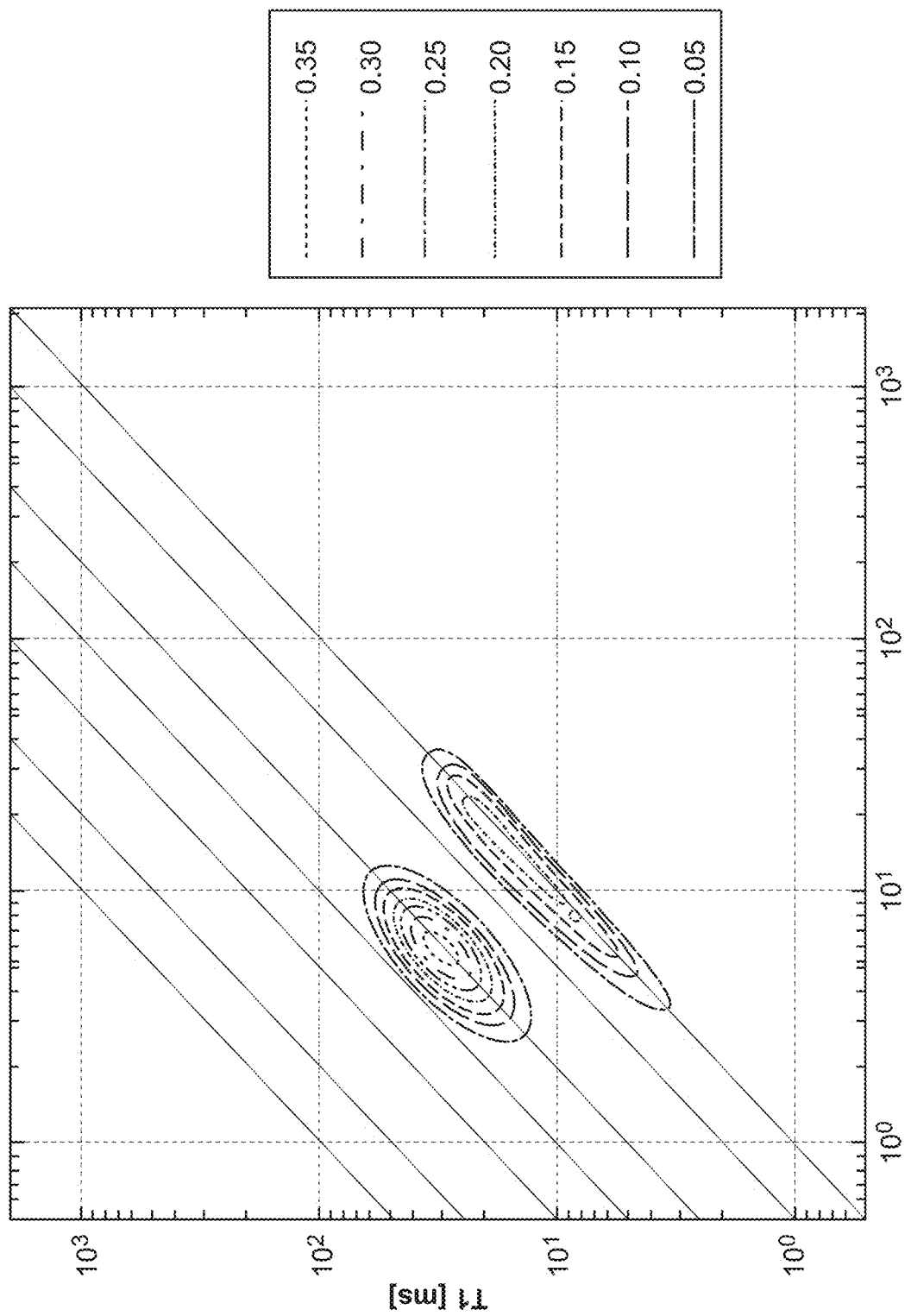
FIG. 5 is an exemplary $T_1$-$T_2$ intensity map obtained from a forward inversion of the D-$T_1$ map.

Example 2 was performed in the same manner as Example 1; however, no noise was added to the data. FIG. 5 illustrates the same $T_1-T_2$ intensity map as FIG. 4A, without noise superimposed. As shown in FIG. 5 the oil and water signals are completely separated.

Example 3

A synthetic reservoir is assumed. Oil based mud is used in drilling the synthetic reservoir; as such, the NMR sensor responses may be contaminated by light oil, such as oil based mud filtrate (OBMF). Gas from the reservoir can be partially dissolved in the OBMF, increasing the gas to oil ratio to about 1200 scf/STB. The reservoir conditions are set at 6000 psi and around 180° F., the $T_1$ of both OBMF and gas are set at 5 seconds, and the $T_1$ of the water exhibits a distribution similar to that illustrated in FIG. 3. The $T_1/T_2$ ratio of the gas and OBMF is set to 1, water is set to the standard value of 1.5. The reservoir parameters are set to the values presented in Table 1. The parameters also correspond to different noise levels and field gradient values. Noise-contaminated echo trains based on these data acquisition and tool attributes were generated using a random noise generator.

Figure 6A:
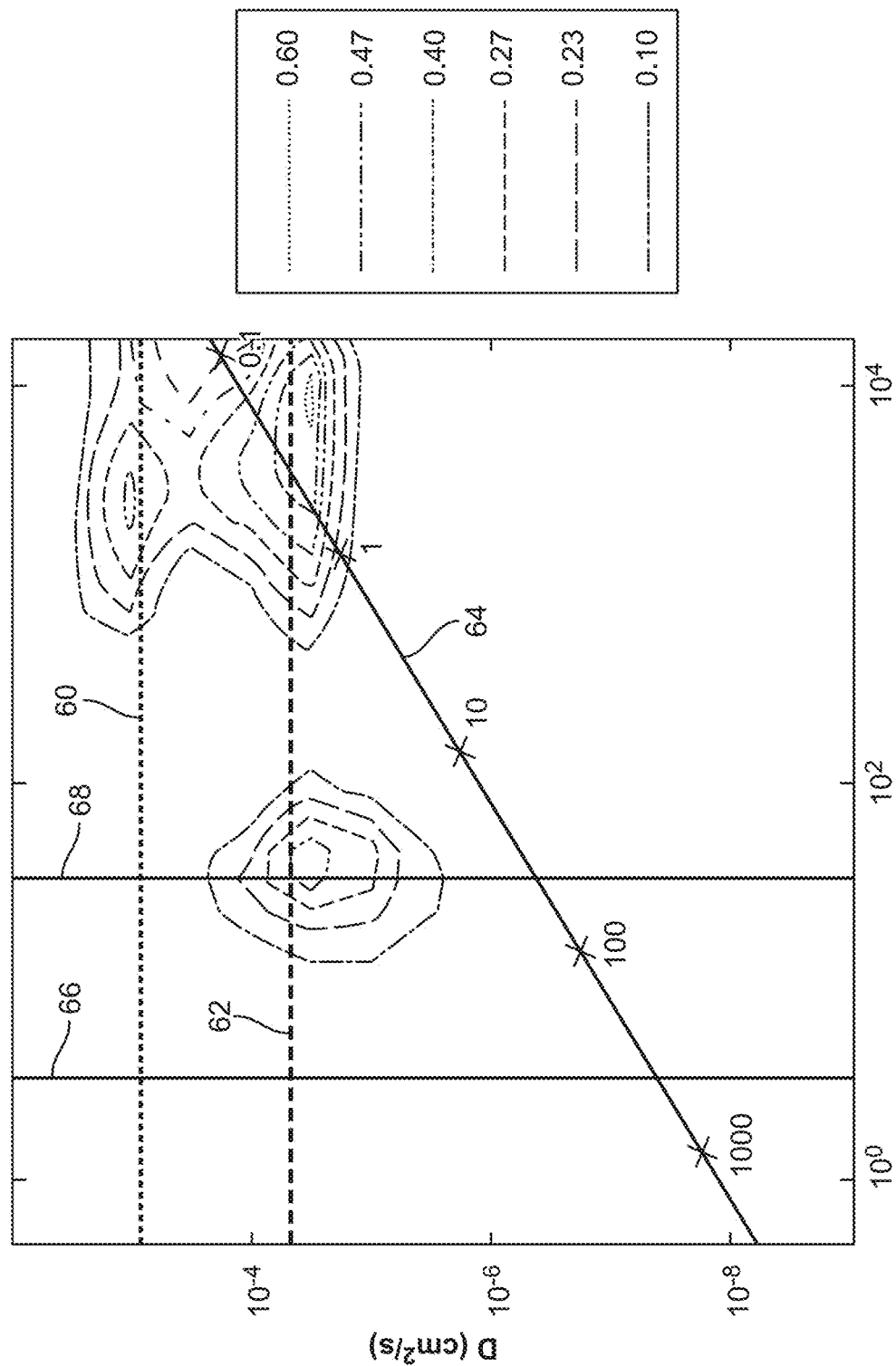
FIG. 6A is an exemplary D-$T_1$ intensity map obtained by D-$T_1$ inversion.
Figure 6B:
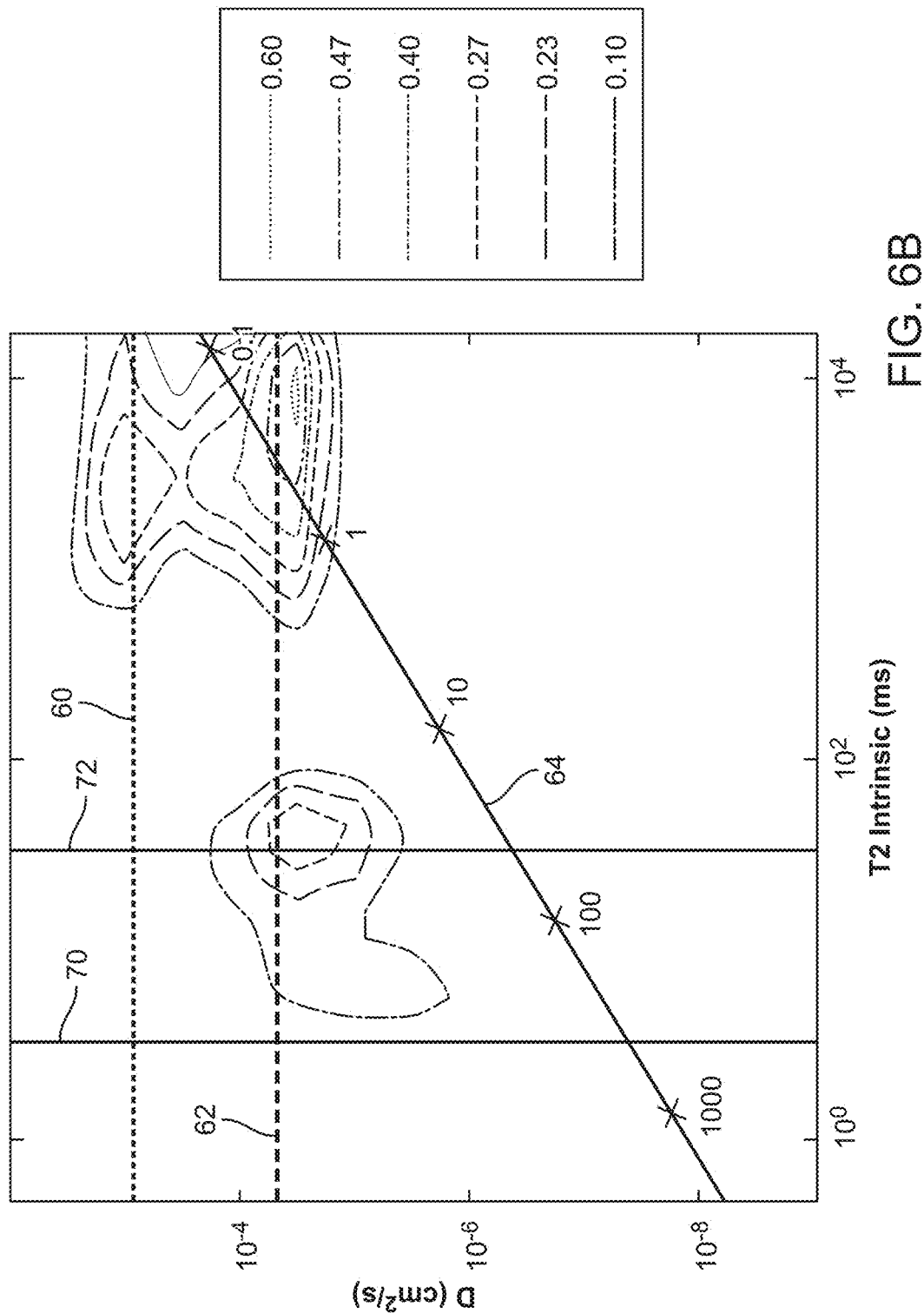
FIG. 6B is an exemplary D-$T_2$ intensity map obtained by D-$T_2$ inversion.

First, $D-T_1$ and $D-T_2$ intensity maps are generated by inverting all the echo trains acquired from the NMR data using a plurality of $G \cdot t_E$ combinations. The results of these inversions are shown in FIGS. 6A and 6B. FIG. 6A illustrates the $D-T_1$ intensity map obtained from the above $D-T_1$ inversion. FIG. 6B illustrates the $D-T_2$ intensity map obtained from the above $D-T_2$ inversion. In both FIGS. 6A and 6B, the label 60 represents the gas diffusivity line, label 62 represents the water diffusivity line, and label 64 represents the oil diffusivity and viscosity line. As shown, each fluid has distinct properties. The gas and OBMF signals are very close in both the D and $T_2$ dimensions, which can create uncertainty in the quantification of fluids. FIG. 6A shows $T_1$ cutoff lines 66, 68; $T_1$ cutoffs can be chosen depending on the capillary pressure and pore-size of the acquired data. Similarly, FIG. 6B shows $T_2$ cutoff lines 70, 72.

Second, the echo trains are forward modeled with the $D-T_1$ inversion data and a field gradient of zero. In the alternative, the forward modeling can be completed using $D-T_2$ or both $D-T_1$ and $D-T_2$ inversion data. Third, $T_1$ and intrinsic $T_2$ inversions are obtained using Eqn. 4. The results of the inversion are shown in FIG. 7. The diagonal lines in FIG. 7 represent $T_1/T_2$ ratios of 1, 2, 4, 8, 16, 32, and 64, respectively (as described with respect to FIGS. 4A-4C). As shown in FIG. 7, the water signal appears between the $T_1/T_2$ ratios of 1 and 2; on the other hand, the gas and OBMF signals appear on the $T_1/T_2$ ratio line 1. The gas and OBMF signals are inseparable based on $T_1/T_2$ ratio.

Example 4

Figure 8A:
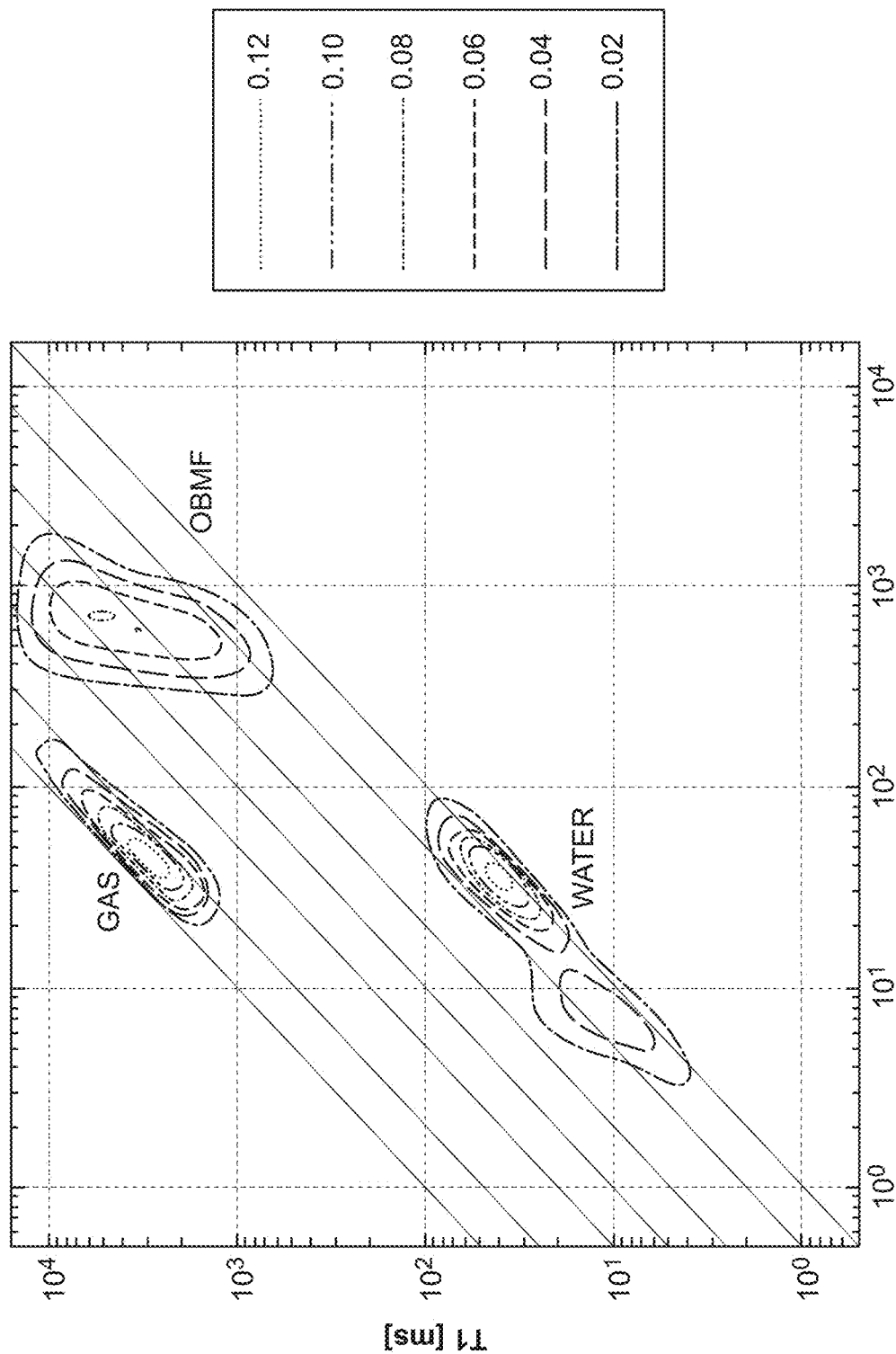
FIG. 8A is an exemplary $T_1$-$T_{2app}$ intensity map derived from D-$T_1$ when $G \cdot t_E = 20$.
Figure 8B:
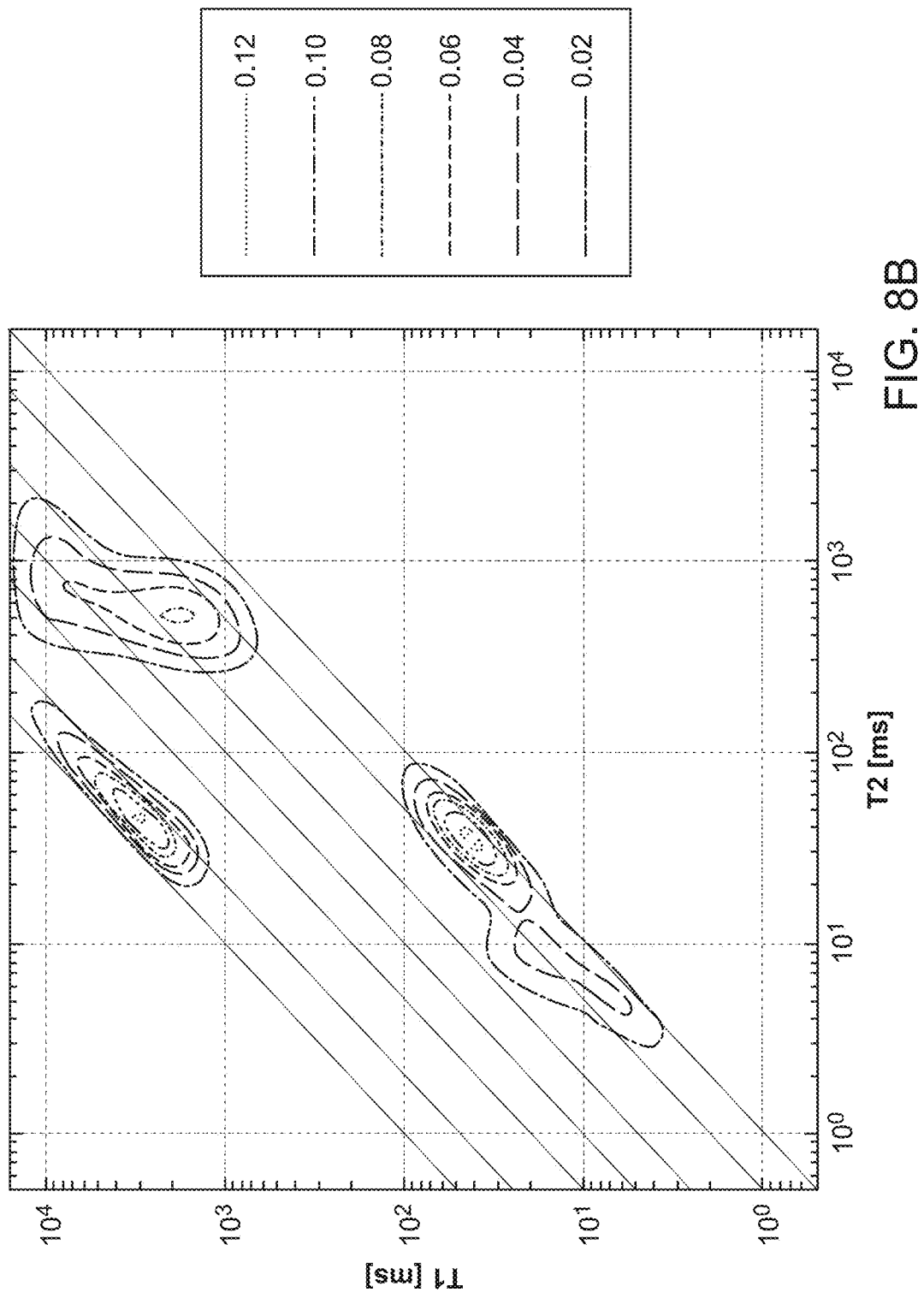
FIG. 8B is an exemplary $T_1$-$T_{2app}$ intensity map derived from D-$T_2$ when $G \cdot t_E = 20$.

Example 4 was performed in the same manner as Example 3; however, a $G \cdot t_E$ value of 20 was used. The $T_1-T_{2app}$ maps presented in FIGS. 8A-8C represent the inversion results obtained using the echo trains forward modeled with the $D-T_1$, $D-T_2$, and both $D-T_1$ and $D-T_2$ data, respectively, wherein $G \cdot t_E=20$. At this $G \cdot t_E$ value, the three fluids, water, OBMF, and gas, are completely separated. The water $T_1/T_{2app}$ ratio is about 1.5, the OBMF has a $T_1/T_{2app}$ ratio of about 8, and gas has a $T_1/T_{2app}$ ratio centered around 32.

Example 5

Figure 9:
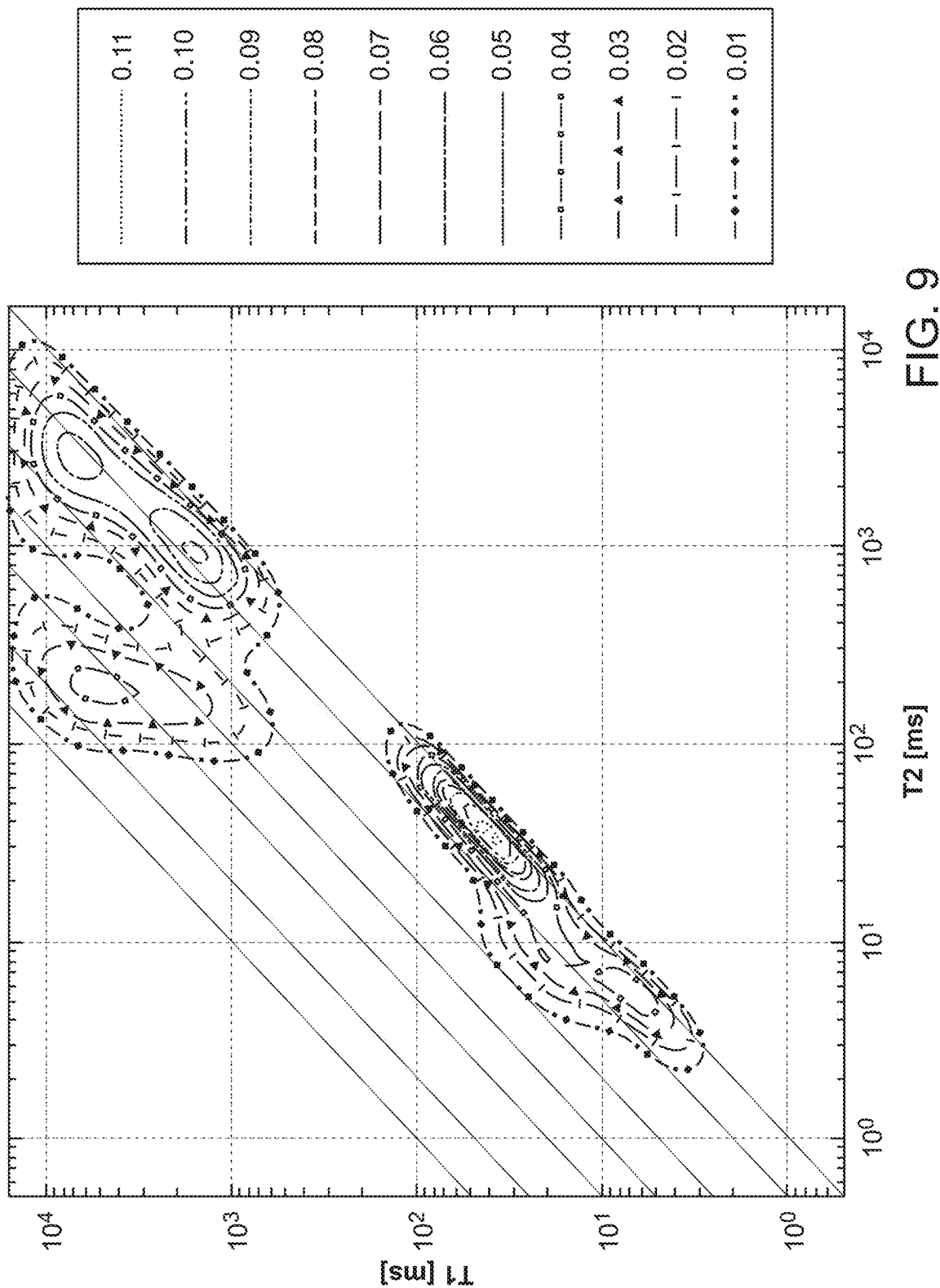
FIG. 9 is an exemplary $T_1$-$T_{2app}$ intensity map when $G \cdot t_E = 10$.

Example 5 was performed in the same manner as Examples 3 and 4, with the exception that a $G \cdot t_E$ value of 10 was used. The results are shown in the $T_1/T_{2app}$ intensity map as shown in FIG. 9. The lower $G \cdot t_E$ value decreases the separation of gas and OBMF.

Example 6

Figure 10:
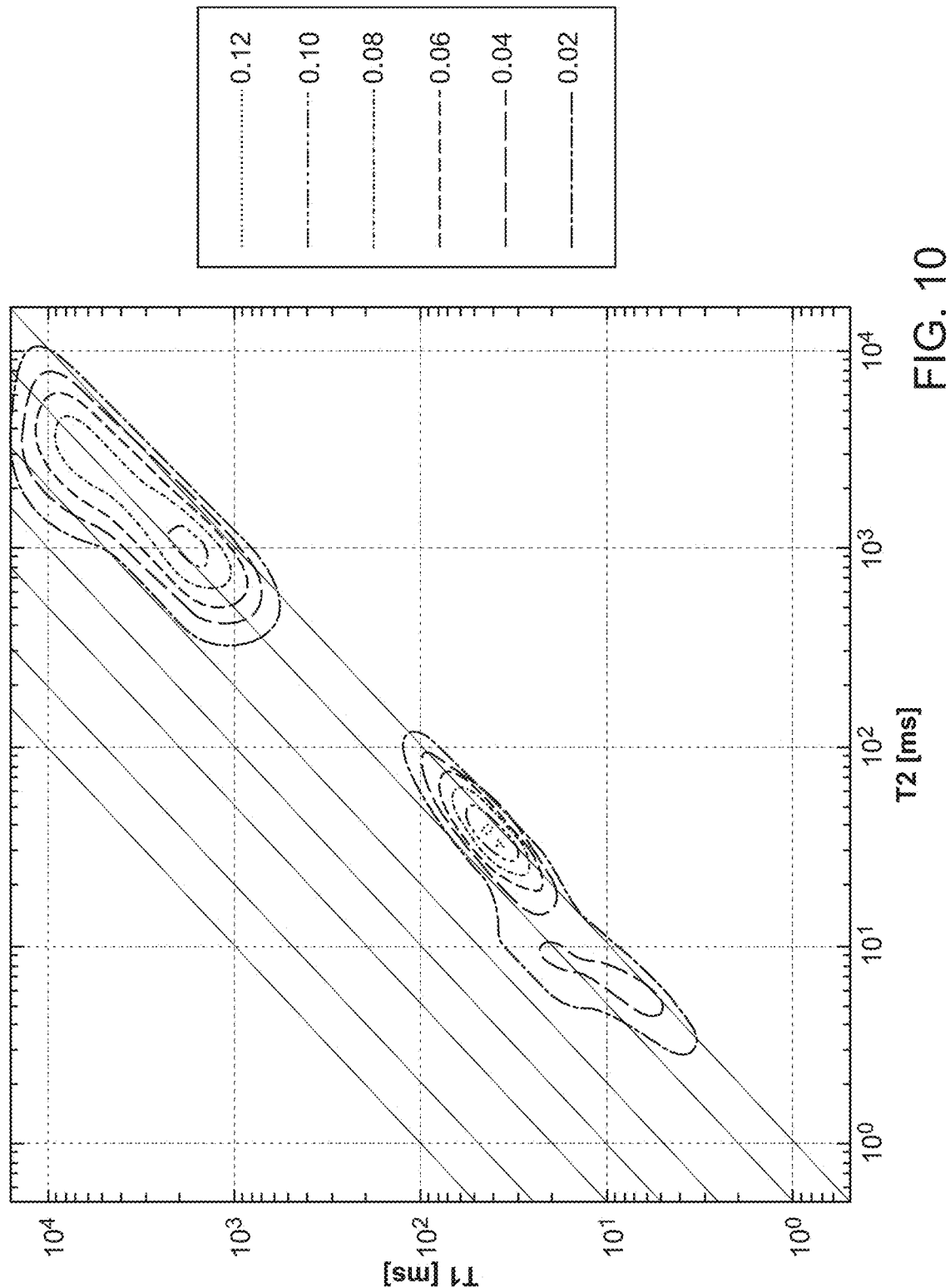
FIG. 10 is an exemplary $T_1$-$T_{2app}$ intensity map when $G \cdot t_E = 5$.

Example 6 was performed in the same manner as Examples 3-5; with the exception that a $G \cdot t_E$ value of 5 was used. The results are shown in the $T_1/T_{2app}$ intensity map as shown in FIG. 10. The lower $G \cdot t_E$ value further decreases the separation of gas and OBMF.

Comparative Example 1

A synthetic reservoir is assumed, the reservoir includes formation water and heavy oil. The heavy oil has an API gravity of 16, with a gas to oil ratio of 100, a temperature of 114° F., and a pressure of 1000 psi. The $T_1/T_2$ ratio was set at 1.5 for water and 4 for oil.

Table 2, below, illustrates a pulse sequence activation set used as inputs in the inversion process. The activation set was generated to include 9 echo trains with different inter-echo times, wait times, and number of echoes. The parameters also correspond to different noise levels and field gradient values. Noise-contaminated echo trains based on these data acquisition and tool attributes were generated using a random noise generator. The data in Table 2 was used in the inversion process resulting in the intensity maps illustrated in FIGS. 11A and 11B.

TABLE 2

| $t_w$ (ms) | $t_E$ (ms) | $N_E$ | G (G/cm) |
|---|---|---|---|
| 8866 | 0.3 | 2000 | 40 |
| 5 | 0.2 | 50 | 40 |
| 10 | 0.2 | 50 | 40 |
| 8866 | 2.4 | 250 | 30 |
| 8865 | 3.6 | 167 | 35 |
| 8866 | 6 | 100 | 40 |
| 30 | 0.2 | 100 | 40 |
| 100 | 0.2 | 300 | 40 |
| 300 | 0.2 | 500 | 20 |
| 3 | 0.2 | 50 | 40 |

Figure 11A:
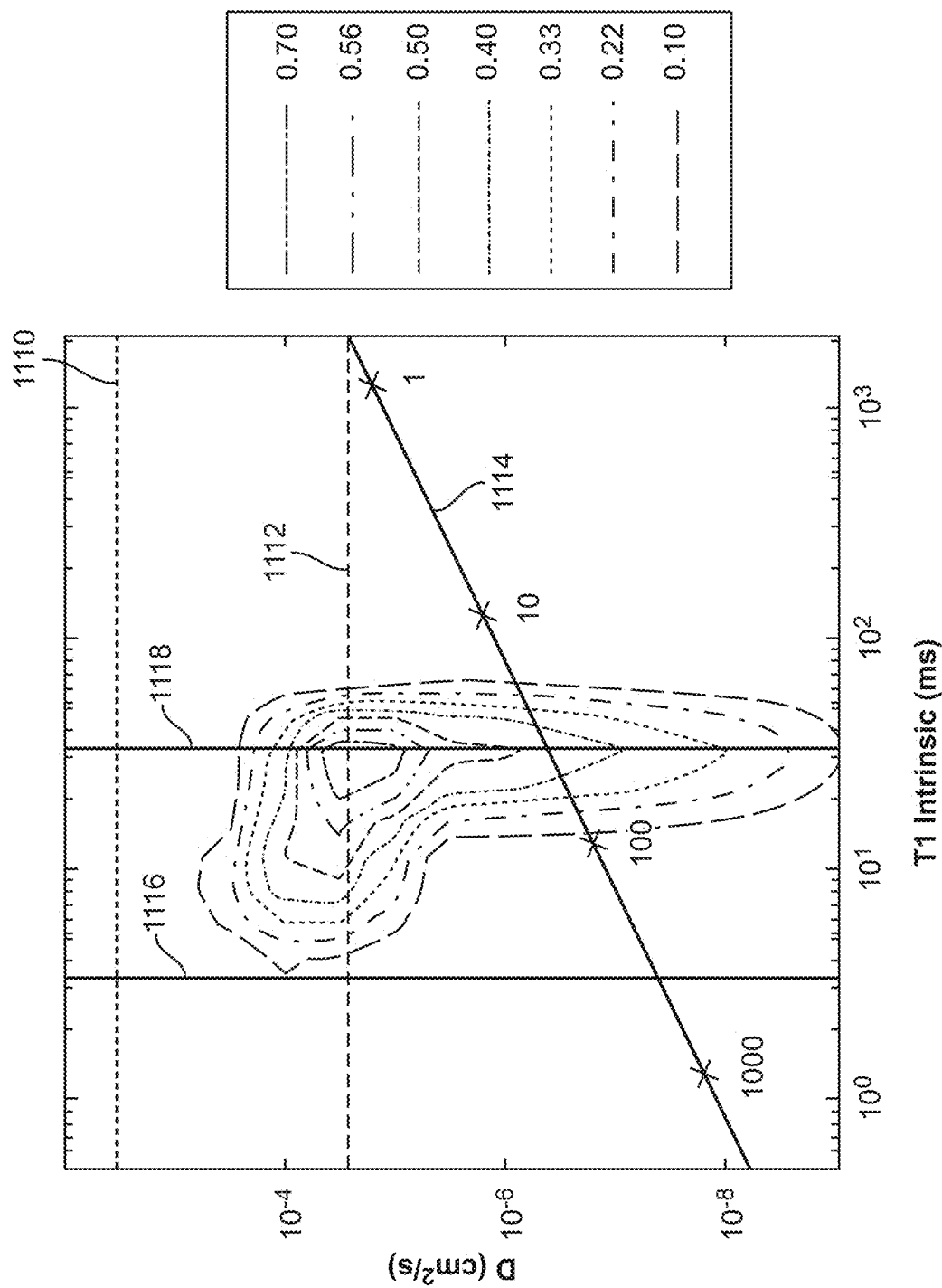
FIG. 11A is an exemplary D-$T_1$ intensity map.
Figure 11B:
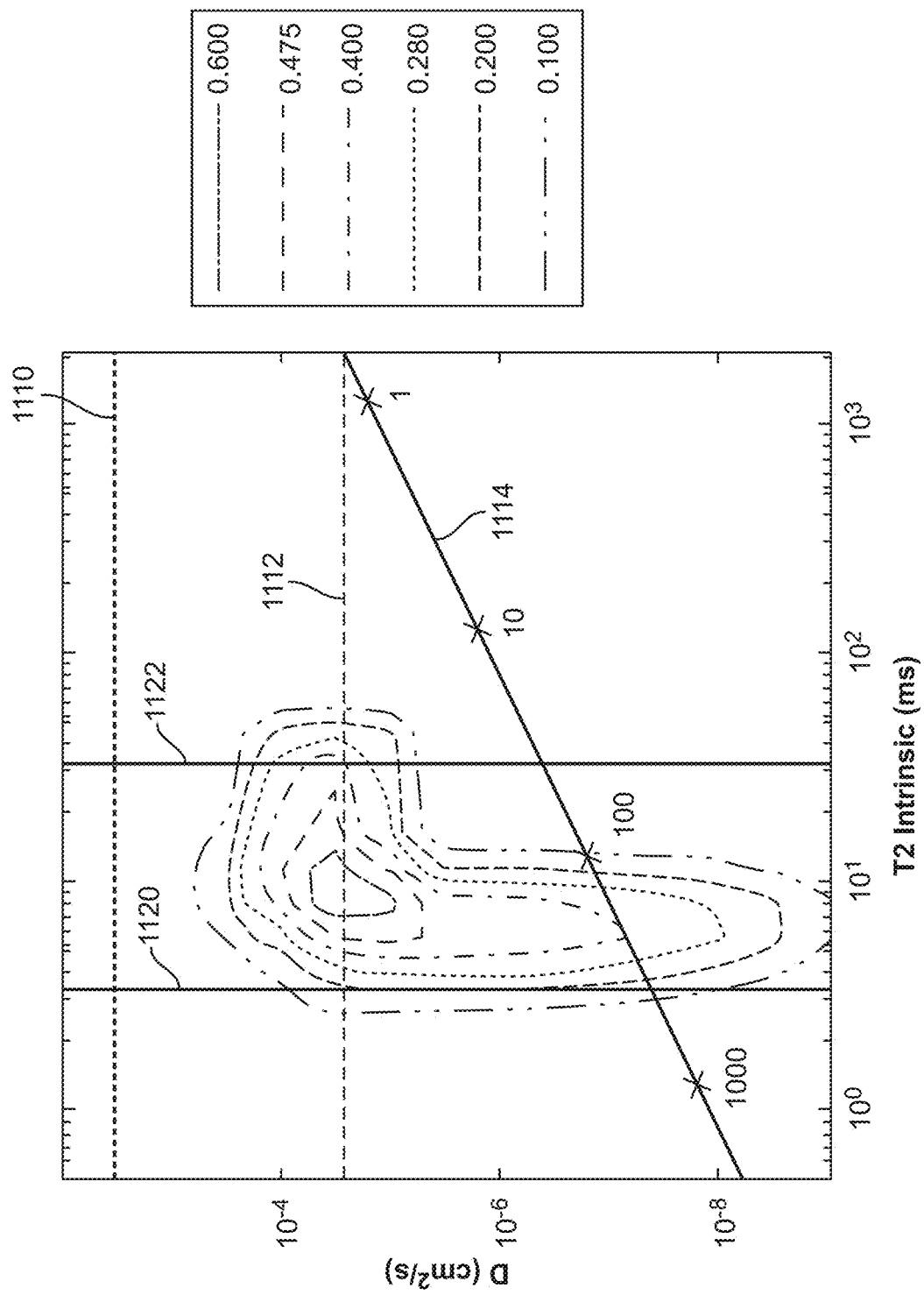
FIG. 11B is an exemplary D-$T_2$ intensity map.

A $D-T_1$ intensity map, as shown in FIG. 11A, can be computed by co-add, pixel-by-pixel, and intensity of the individual $D-T_1$ map wherein $\Sigma_{m=1}^{Mt} E_{0,mnp} = E_{0,np}$. FIG. 11B shows a similar map for the $D-T_2$ values. The overlap in relaxation time dimension and diffusion dimension can make the quantification of fluids difficult. In both FIGS. 11A and 11B, the label 1110 represents the gas diffusivity line, label 1112 represents the water diffusivity line, and label 1114 represents the oil diffusivity and viscosity line. FIG. 11A shows $T_1$ cutoff lines 1116, 1118; $T_1$ cutoffs can be chosen depending on the capillary pressure and pore-size of the acquired data. Similarly, FIG. 11B shows $T_2$ cutoff lines 1120, 1122.

Figure 12:
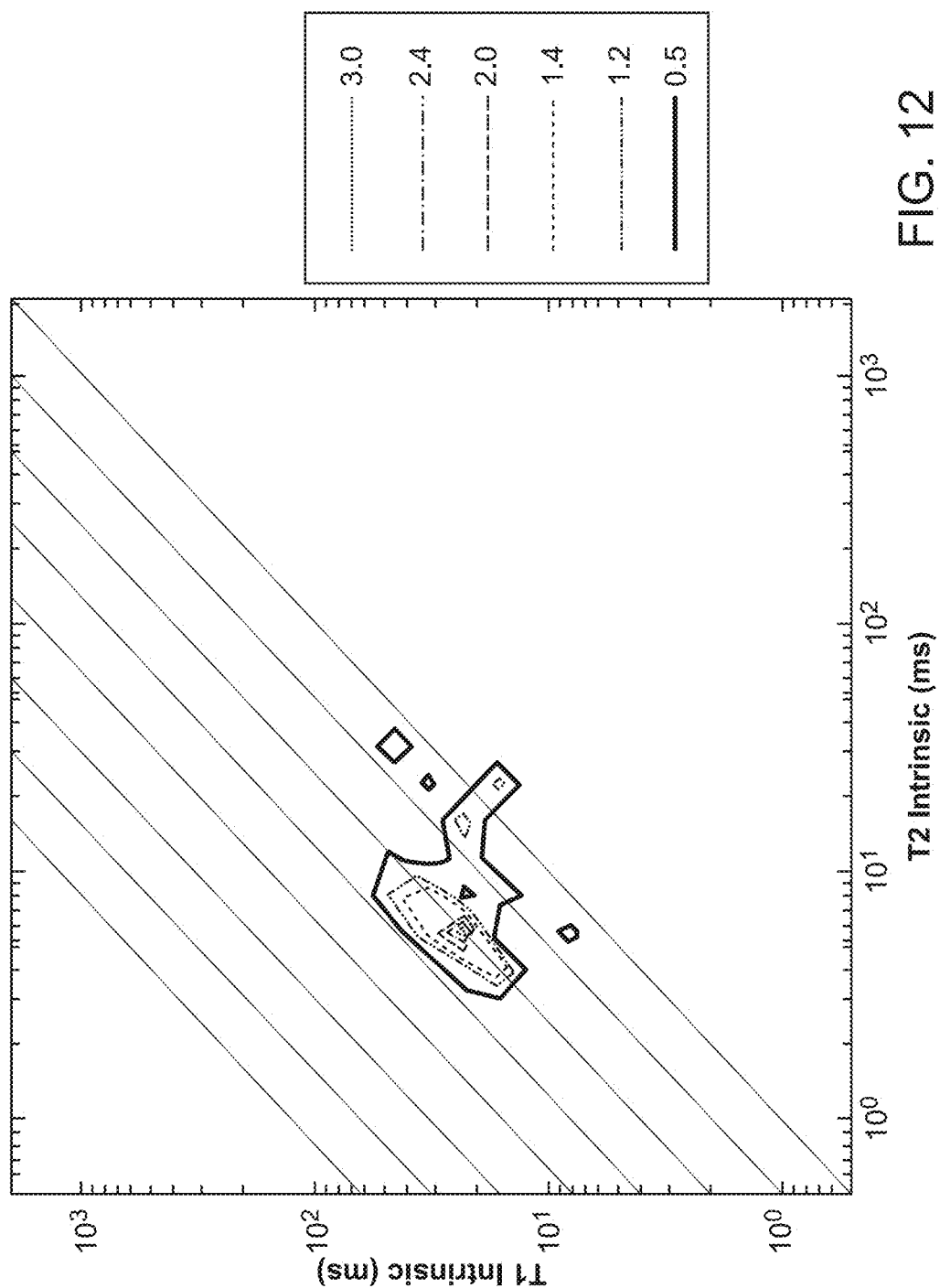
FIG. 12 is an exemplary $T_1$-$T_2$ map intensity map.

A $T_1-T_2$ intensity map can be derived from either the $D-T_1$ or $D-T_2$ intensity map shown in FIGS. 11A and 11B. The resulting intensity map is shown in FIG. 12. In FIG. 12, only 4 distinct $T_1/T_2$ ratios can be identified, thus, the quantification of the fluids within the reservoir become extremely difficult.

Comparative Example 2

Comparative Example 2 was performed in the same manner as Comparative Example 1; with the exception that OBMF is present in the reservoir. When OBMF is present a $T_1-T_2$ intensity map, as derived above, will not sufficiently differentiate the fluid signals. A $T_1-T_{2app}$ map must be derived.

The $D-T_2$ intensity map can be derived from either Equation 1 or Equation 2. In deriving a $T_1-T_{2app}$ map without forward modeling, the field gradient must be averaged out. To do so, $T_{2app}$ is defined by $$\frac{1}{T_{2app}} = \frac{1}{T_2} + \frac{\gamma^2 G^2 t_E^2 \cdot D}{12},$$

thus, $T_{2app}$ is dependent on $G \cdot t_E$. Only a subset of the acquired echo trains with similar $G \cdot t_E$ values can be used to derive the $T_1$-$T_{2app}$ intensity map. The results fail to include all the acquired data and therefore can be inaccurate.

Numerous examples are provided herein to enhance understanding of the present disclosure. A specific set of statements are provided as follows.

Statement 1: An apparatus including one or more NMR sensors; a data acquisition processor communicatively coupled with the one or more NMR sensors, and a first memory storing instructions that, when executed by the data acquisition processor, cause the data acquisition processor to perform operations comprising acquiring, at the one or more NMR sensors, data of earth formation fluid, varying at least one of a magnetic field gradient and an inter-echo time, and acquiring additional data; and a data processing unit communicatively coupled with the data acquisition tool, the data processing unit comprising a second memory storing instruction that, when executed by a data processor, cause the data processor to perform operations comprising receiving the data acquired by the data acquisition tool, constructing a mathematical model of the data acquired by the data acquisition tool, conducting a first inversion of the mathematical model to obtain a first set of NMR responses, performing a forward model of the first set of NMR responses obtained from the first inversion, conducting a second inversion of the forward modeled data to obtain a second set of NMR responses, and determining earth formation fluid properties based on the second set of NMR responses; and a display communicatively coupled to the data processing unit and rendering the determined earth formation.

Statement 2: An apparatus is disclosed according to Statement 1, wherein the data acquisition tool further comprises a data transmitter.

Statement 3: An apparatus is disclosed according to Statement 1 or Statement 2, wherein the data processing unit further comprises a data receiver.

Statement 4: An apparatus is disclosed according to Statements 1-3, wherein the data of earth fluid formations includes longitudinal relaxation time ($T_1$), transverse relaxation time ($T_2$), and diffusivity (D).

Statement 5: An apparatus is disclosed according to Statements 1-4, wherein the result of the first inversion is one of a D-$T_1$ map, a D-$T_2$ map, or a D-$T_1$ and D-$T_2$ map.

Statement 6: An apparatus is disclosed according to Statements 1-5, wherein the data processing unit is located externally to the wellbore.

Statement 7: An apparatus is disclosed according to Statements 1-6, wherein the second set of NMR responses is one of a $T_1$-$T_2$ map and a $T_1$-$T_{2app}$ map.

Statement 8: An apparatus is disclosed according to Statements 1-7, wherein a physical constraint is used in place of $T_1$ to derive D-$T_2$ in the first inversion.

Statement 9: An apparatus is disclosed according to Statements 1-8, wherein a physical constraint is used in place of $T_2$ to derive D-$T_1$ in the first inversion.

Statement 10: An apparatus is disclosed according to Statements 1-9, wherein the physical constraint comprises a finite range of $T_1/T_2$ values.

Statement 11: An apparatus is disclosed according to Statements 1-10, wherein the finite range of $T_1/T_2$ values is between about 1 and about 10.

Statement 12: An apparatus is disclosed according to Statements 1-11, wherein the acquired data is a plurality of echo trains.

Statement 13: An apparatus is disclosed according to Statements 1-12, wherein the plurality of echo trains vary in at least one of inter-echo time, wait time, field gradient, and number of echoes.

Statement 14: An apparatus is disclosed according to Statements 1-13, wherein the magnetic field gradient in inter-echo time is zero.

Statement 15: An apparatus is disclosed according to Statements 1-14, wherein the magnetic field gradient in inter-echo time is non-zero.

Statement 16: An apparatus is disclosed according to Statements 1-15, wherein the forward model comprises varying at least one of the magnetic field gradient, the inter-echo time, and a wait time to obtain a plurality of synthetic echo trains.

Statement 17: An apparatus is disclosed according to Statements 1-16, wherein one of a gas and an oil is quantified from the second set of NMR responses.

Statement 18: An apparatus is disclosed according to Statements 1-17, wherein the NMR data acquisition tool is configured to be integrated into a bottom-hole assembly near a drill bit.

Statement 19: An apparatus is disclosed according to Statements 1-8, wherein the data acquisition memory is configured to store the acquired NMR data.

Statement 20: An apparatus is disclosed according to Statements 1-19, wherein the data transmitter transmits the data to the data processing unit.

Statement 21: An apparatus is disclosed according to Statements 1-20, wherein the data receiver receives data from the data transmitter.

Statement 22: A method for determining earth formation fluid properties, the method including providing a data acquisition tool comprising one or more NMR sensors, a data acquisition processor communicatively coupled with the one or more NMR sensors, and a first memory communicatively coupled with the data acquisition processor; lowering the data acquisition tool to a desired location within a wellbore; receiving, at the data acquisition tool, data of earth formation fluid; varying, at the data acquisition tool, at least one of a magnetic field gradient and an inter-echo time; and acquiring, at the data acquisition tool, additional data of earth formation fluid; transmitting the acquired data and the additional data to a data processing unit communicatively coupled with the data acquisition tool, the data processing unit comprising a data processor and a second memory; constructing, at the data processor, a mathematical model of the data acquired by the data acquisition tool; conducting, at the processor, a first inversion of the mathematical model to obtain a first set of NMR responses; performing, at the data processor, a forward model of the first set of NMR responses obtained from the first inversion; conducting, at the data processor, a second inversion of the forward modeled data to obtain a second set of NMR responses; determining, at the data processor, earth formation fluid properties based on the second set of NMR responses; and displaying the earth formation fluid properties on a display screen communicatively coupled with the data processing unit.

Statement 23: A method is disclosed according to Statement 22, wherein receiving data of earth formation fluid includes longitudinal relaxation ($T_1$), transverse relaxation time ($T_2$), and diffusivity (D).

Statement 24: A method is disclosed according to Statement 22 or Statement 23, wherein conducting a first inversion further comprises using a physical constraint in place of $T_1$ to derive D-$T_2$.

Statement 25: A method is disclosed according to Statements 22-24, wherein conducting a first inversion further comprises using a physical constraint in place of $T_2$ to derive $D-T_1$.

Statement 26: A method is disclosed according to Statements 22-5, wherein the physical constraint comprises a finite range of $T_1/T_2$ values.

Statement 27: A method is disclosed according to Statements 22-26, wherein the finite range of $T_1/T_2$ values is between about 1 and about 10.

Statement 28: A method is disclosed according to Statements 22-27, further comprising storing the NMR data at the first memory.

Statement 29: A method is disclosed according to Statements 22-28, wherein the data acquired is a plurality of echo trains.

Statement 30: A method is disclosed according to Statements 22-29, wherein the plurality of echo trains vary in at least one of inter-echo time, wait time, field gradient, and number of echoes.

Statement 31: A method is disclosed according to Statements 22-30, wherein one of a $D-T_1$ map, a $D-T_2$ map, and a $D-T_1$ and a $D-T_2$ map is derived from the first inversion.

Statement 32: A method is disclosed according to Statements 22-31, wherein the magnetic field gradient in inter-echo time is zero.

Statement 33: A method is disclosed according to Statements 22-32, wherein the magnetic field gradient in inter-echo time is non-zero.

Statement 34: A method is disclosed according to Statements 22-33, wherein performing the forward model further comprises varying at least one of the magnetic field gradient, the inter-echo time, and a wait time to obtain a plurality of synthetic echo trains.

Statement 35: A method is disclosed according to Statements 22-34, wherein one of a $T_1-T_2$ map, a $T_1-T_{2app}$ map, and a $D-T_1$ map and a $D-T_2$ map is derived from the second set of NMR responses.

Statement 36: A method is disclosed according to Statements 22-35, further comprising quantifying at least one of a gas and an oil from the second set of NMR responses.

Statement 37: A method is disclosed according to Statements 22-36, wherein the NMR data acquisition tool is coupled to a drill string.

Statement 38: A method is disclosed according to Statements 22-37, wherein the NMR data acquisition tool is integrated into a bottom-hole assembly near a drill bit.

Statement 39: A method is disclosed according to Statements 22-38, further comprising transmitting the acquired data from a data transmitter coupled to the data acquisition tool to a data receiver coupled to the data processing unit.

Statement 40: A system including a wellbore with a data acquisition tool disposed therein, the data acquisition tool comprising one or more NMR sensors communicatively coupled to a data acquisition processor, and a first memory communicatively coupled to the data acquisition processor; a data processing unit communicatively coupled with the data acquisition tool, the data processing unit comprising a second memory storing instructions that, when executed by a data processor, cause the data processor to perform operations comprising receiving data acquired by the data acquisition tool, constructing a mathematical model of the data acquired by the data acquisition tool, conducting a first inversion of the mathematical model to obtain a first set of NMR responses, performing a forward model of the first set of NMR responses obtained from the first inversion, conducting a second inversion of the forward modeled data to obtain a second set of NMR responses, and determining earth formation fluid properties based on the second set of NMR responses; and a display communicatively coupled to the data processing unit and rendering the determined earth formation.

Statement 41: A system is disclosed according to Statement 40, wherein the data acquisition tool further comprises a data transmitter.

Statement 42: A system is disclosed according to Statement 40 or Statement 41, wherein the data processing unit further comprises a data receiver.

Statement 43: A system is disclosed according to Statements 40-42, wherein the data of earth formations includes longitudinal relaxation ($T_1$), transverse relaxation time ($T_2$), and diffusivity (D).

Statement 44: A system is disclosed according to Statements 40-43, wherein the result of the first inversion is one of a $D-T_1$ map, a $D-T_2$ map, or a $D-T_1$ and $D-T_2$ map.

Statement 45: A system is disclosed according to Statements 40-44, wherein the second set of NMR responses is one of a $T_1-T_2$ map and a $T_1-T_{2app}$ map.

Statement 46: A system is disclosed according to Statements 40-45, wherein a physical constraint is used in place of $T_1$ to derive $D-T_2$ in the first inversion.

Statement 47: A system is disclosed according to Statements 40-46, wherein a physical constraint is used in place of $T_2$ to derive $D-T_1$ in the first inversion.

Statement 48: A system is disclosed according to Statements 40-47, wherein the physical constraint comprises a finite range of $T_1/T_2$ values.

Statement 49: A system is disclosed according to Statements 40-48, wherein the finite range of $T_1/T_2$ values is between about 1 and about 10.

Statement 50: A system is disclosed according to Statements 40-49, wherein the acquired data is a plurality of echo trains.

Statement 51: A system is disclosed according to Statements 40-50, wherein the plurality of echo trains vary in at least one of inter-echo time, wait time, field gradient, and number of echoes.

Statement 52: A system is disclosed according to Statements 40-51, wherein the magnetic field gradient in inter-echo time is zero.

Statement 53: A system is disclosed according to Statements 40-52, wherein the magnetic field gradient in inter-echo time is non-zero.

Statement 54: A system is disclosed according to Statements 40-53, wherein the forward model comprises varying at least one of the magnetic field gradient, the inter-echo time, and a wait time to obtain a plurality of synthetic echo trains.

Statement 55: A system is disclosed according to Statements 40-54, wherein one of a gas and an oil is quantified from the second set of NMR responses.

Statement 56: A system is disclosed according to Statements 40-55, wherein the data acquisition tool is coupled to a drill string.

Statement 57: A system is disclosed according to Statements 40-56, further comprising a drill string, wherein the data acquisition tool is integrated into a bottom-hole assembly near a drill bit on the drill string.

Statement 58: A system is disclosed according to Statements 40-57, further comprising a memory to store the acquired data.

Statement 59: A system is disclosed according to Statements 50-58, wherein the data processing unit is located external to the wellbore.

Statement 60: A method for determining earth formation fluid properties, the method including lowering a core sampling tool into a wellbore and extracting a core sample from a earth formation therein; providing a data acquisition tool comprising one or more NMR sensors, a data acquisition processor communicatively coupled with the one or more NMR sensors, and a first memory communicatively coupled with the data acquisition processor; acquiring, at the data acquisition tool, earth formation fluid data of the core sample; varying, at the data acquisition tool, at least one of a magnetic field gradient and an inter-echo time; acquiring additional data; transmitting the acquired data and the additional data to a data processing unit communicatively coupled with the data acquisition tool, the data processing unit comprising a data processor and a second memory; constructing, at the data processor, a mathematical model of the data acquired by the data acquisition tool; conducting, at the processor, a first inversion of the mathematical model to obtain a first set of NMR responses; performing, at the data processor, a forward model of the first set of NMR responses obtained from the first inversion; conducting, at the data processor, a second inversion of the forward modeled data to obtain a second set of NMR responses; determining, at the data processor, earth formation fluid properties based on the second set of NMR responses; and displaying the earth formation fluid properties on a display screen communicatively coupled with the data processing unit.

Statement 61: A method is disclosed according to Statement 60, wherein receiving data of earth formation fluid includes longitudinal relaxation ($T_1$), transverse relaxation time ($T_2$), and diffusivity (D).

Statement 62: A method is disclosed according to Statement 60 or Statement 61, wherein conducting a first inversion further comprises using a physical constraint in place of $T_1$ to derive $D-T_2$.

Statement 63: A method is disclosed according to Statements 60-62, wherein conducting a first inversion further comprises using a physical constraint in place of $T_2$ to derive $D-T_1$.

Statement 64: A method is disclosed according to Statements 60-63, wherein the physical constraint comprises a finite range of $T_1/T_2$ values.

Statement 65: A method is disclosed according to Statements 60-64, wherein the finite range of $T_1/T_2$ values is between about 1 and about 10.

Statement 66: A method is disclosed according to Statements 60-65, wherein performing the forward model further comprises varying at least one of the magnetic field gradient, the inter-echo time, and a wait time to obtain a plurality of synthetic echo trains.

Statement 67: A method is disclosed according to Statements 60-66, further comprising storing the NMR data at the first memory.

Statement 68: A method is disclosed according to Statements 60-67, wherein the data acquired is a plurality of echo trains.

Statement 69: A method is disclosed according to Statements 60-68, wherein the plurality of echo trains vary in at least one of inter-echo time, wait time, field gradient, and number of echoes.

Statement 70: A method is disclosed according to Statements 60-69, wherein one of a $D-T_1$ map, a $D-T_2$ map, and a $D-T_1$ and a $D-T_2$ map is derived from the first inversion.

Statement 71: A method is disclosed according to Statements 60-70, wherein the magnetic field gradient in inter-echo time is zero.

Statement 72: A method is disclosed according to Statements 60-71, wherein the magnetic field gradient in inter-echo time is non-zero.

Statement 73: A method is disclosed according to Statements 60-72, wherein one of a $T_1-T_2$ map, a $T_1-T_{2app}$ map, and a $D-T_1$ map and a $D-T_2$ map is derived from the second set of NMR responses.

Statement 74: A method is disclosed according to Statements 60-73, further comprising quantifying at least one of a gas and an oil from the second set of NMR responses.

Statement 75: A method is disclosed according to Statements 60-74, further comprising transmitting the acquired data from a data transmitter coupled to the data acquisition tool to a data receiver coupled to the data processing unit.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:
1. An apparatus comprising:
   a data acquisition tool comprising:
      one or more nuclear magnetic resonance (NMR) sensors;
      a data acquisition processor communicatively coupled with the one or more NMR sensors; and
      a first memory storing instructions that, when executed by the data acquisition processor, cause the data acquisition processor to perform operations comprising:
         acquiring, at the one or more NMR sensors, data of earth formation fluid,
         varying at least one of a magnetic field gradient and an inter-echo time, and
         acquiring additional data of the earth formation fluid; and
   a data processing unit comprising:
      a second memory storing instructions that, when executed by a data processor, cause the data processor to perform operations comprising:
         constructing a mathematical model of the first and additional data acquired by the data acquisition tool,
         conducting a first inversion of the mathematical model to obtain a first set of NMR responses,
         performing a forward model of the first set of NMR responses obtained from the first inversion to obtain a plurality of synthetic echo trains,
         conducting a second inversion of the forward modeled data comprising the synthetic echo trains to obtain a second set of NMR responses, and
         determining earth formation fluid properties based on the second set of NMR responses; and
   a display communicatively coupled to the data processing unit and rendering the determined earth formation.

2. The apparatus of claim 1, wherein the data acquisition tool further comprises a data transmitter.

3. The apparatus of claim 1, wherein the data processing unit further comprises a data receiver.

4. The apparatus of claim 1, wherein the data of earth fluid formations includes longitudinal relaxation time ($T_1$), transverse relaxation time ($T_2$), and diffusivity (D).

5. The apparatus of claim 1, wherein the result of the first set of NMR response is one of a $D-T_1$ map, a $D-T_2$ map, or a $D-T_1$ and $D-T_2$ map.

6. The apparatus of claim 1, wherein the data processing unit is located externally to a wellbore.

7. The apparatus of claim 1, wherein the second set of NMR responses is one of a $T_1-T_2$ map and a $T_1-T_{2app}$ map.

8. The apparatus of claim 1, wherein the forward model of the first set of NMR responses is obtained from the first inversion by varying at least one of the magnetic field gradient, the inter-echo time, or wait time to obtain a plurality of synthetic echo trains.

9. A method for determining earth formation fluid properties, the method comprising:
providing a data acquisition tool comprising:
one or more nuclear magnetic resonance (NMR) sensors,
a data acquisition processor and
a first memory
lowering the data acquisition tool to a desired location within a wellbore;
receiving, at the data acquisition tool, data of earth formation fluid;
varying, at the data acquisition tool, at least one of a magnetic field gradient and an inter-echo time,
acquiring, at the data acquisition tool, additional data of earth formation fluid;
constructing, at a data processing unit comprising a data processor and a second memory, a mathematical model of the data acquired by the data acquisition tool;
conducting, at the data processing unit, a first inversion of the mathematical model to obtain a first set of NMR responses;
performing, at the data processing unit, a forward model of the first set of NMR responses obtained from the first inversion to obtain a plurality of synthetic echo trains;
conducting, at the data processing unit, a second inversion of the forward modeled data comprising the synthetic echo trains to obtain a second set of NMR responses;
determining, at the data processing unit, earth formation fluid properties based on the second set of NMR responses; and
displaying the earth formation fluid properties on a display screen communicatively coupled with the data processing unit.

10. The method of claim 9, wherein receiving data of earth formation fluid includes longitudinal relaxation ($T_1$), transverse relaxation time ($T_2$), and diffusivity (D).

11. The method of claim 9, wherein conducting a first inversion further comprises using a physical constraint in place of $T_1$ to derive $D-T_2$.

12. The method of claim 11, wherein the physical constraint comprises a finite range of $T_1/T_2$ values.

13. The method of claim 12, wherein the finite range of $T_1/T_2$ values is between about 1 and about 10.

14. The method of claim 9, wherein conducting a first inversion further comprises using a physical constraint in place of $T_2$ to derive $D-T_1$.

15. The method of claim 9, after acquiring, at the data acquisition tool, additional data of earth formation fluid, transmitting the acquired data and the additional data to the data processing unit, the data processing unit being communicatively coupled with the data acquisition tool.

16. A system comprising:
a data acquisition tool disposed in a wellbore, the data acquisition tool comprising:
one or more nuclear magnetic resonance (NMR) sensors,
a data acquisition processor communicatively coupled with the one or more NMR sensors,
a first memory storing instructions that, when executed by the data acquisition processor, cause the data acquisition processor to perform operations comprising:
acquiring, at the one or more NMR sensors, data of earth formation fluid,
varying at least one of a magnetic field gradient and an inter-echo time, and
acquiring additional data of the earth formation fluid;
a data processing unit comprising:
a second memory storing instructions that, when executed by a data processor, cause the data processor to perform operations comprising:
constructing a mathematical model of the data acquired by the data acquisition tool,
conducting a first inversion of the mathematical model to obtain a first set of NMR responses,
performing a forward model of the first set of NMR responses obtained from the first inversion to obtain a plurality of synthetic echo trains,
conducting a second inversion of the forward modeled data comprising the synthetic echo trains to obtain a second set of NMR responses, and
determining earth formation fluid properties based on the second set of NMR responses; and
a display communicatively coupled to the data processing unit and rendering the determined earth formation.

17. The system of claim 16, wherein the data processing unit is communicatively coupled with the data acquisition tool and wherein the data processing unit receives data acquired by the data acquisition tool.

18. The system of claim 16, wherein the data acquisition tool further comprises a data transmitter and wherein the data processing unit further comprises a data receiver.

19. The system of claim 16, wherein the data of earth formations includes longitudinal relaxation ($T_1$), transverse relaxation time ($T_2$), and diffusivity (D).

20. The system of claim 16, wherein the result of the first set of NMR response is one of a $D-T_1$ map, a $D-T_2$ map, or a $D-T_1$ and $D-T_2$ map.

21. The system of claim 16, wherein the second set of NMR responses is one of a $T_1-T_2$ map and a $T_1-T_{2app}$ map.

* * * * *